(12) United States Patent
Olson

(10) Patent No.: US 10,724,769 B2
(45) Date of Patent: Jul. 28, 2020

(54) SYSTEM AND METHOD FOR PROVIDING USEABLE SOURCE FLUID

(71) Applicant: Gaylord Olson, Princeton, NJ (US)

(72) Inventor: Gaylord Olson, Princeton, NJ (US)

(*) Notice: Subject to any disclaimer, the term of this patent is extended or adjusted under 35 U.S.C. 154(b) by 0 days.

(21) Appl. No.: 16/592,538

(22) Filed: Oct. 3, 2019

(65) Prior Publication Data

US 2020/0109861 A1 Apr. 9, 2020

Related U.S. Application Data

(60) Provisional application No. 62/909,607, filed on Oct. 2, 2019, provisional application No. 62/766,131, filed on Oct. 4, 2018.

(51) Int. Cl.
*F25B 27/00* (2006.01)
(52) U.S. Cl.
CPC .......... *F25B 27/00* (2013.01); *F24D 2200/11* (2013.01)
(58) Field of Classification Search
CPC .... F25B 27/00; F24F 5/046; F24F 2005/0057
See application file for complete search history.

(56) References Cited

U.S. PATENT DOCUMENTS

| | | | |
|---|---|---|---|
| 4,012,920 A | | 3/1977 | Kirschbaum |
| 4,489,568 A | * | 12/1984 | Shapess ............... F16L 55/02 62/324.1 |
| 5,461,876 A | | 10/1995 | Dressler |
| 8,701,432 B1 | | 4/2014 | Olson |
| 8,726,682 B1 | * | 5/2014 | Olson ................... F25B 30/00 62/260 |

* cited by examiner

*Primary Examiner* — David J Teitelbaum
(74) *Attorney, Agent, or Firm* — RoyerIP, LLC; Roy Rosser

(57) ABSTRACT

A system and method for providing useable source fluid from a thermal exchange unit and/or one or more thermal exchange and storage units is disclosed. Topologies described allow operation in an air source, a ground source, a preconditioning, a parallel and a simultaneous mode. In the air source mode conditioned source fluid is obtained exclusively from an air-to-liquid heat exchanger. In the ground source mode source fluid is obtained exclusively from a ground heat exchanger. In the preconditioning mode source fluid from the air-to-liquid heat exchanger is used to condition a ground heat exchanger. In the parallel mode source fluid is obtained from both the air-to-liquid heat exchanger and a ground heat exchangers. In the simultaneous mode, source fluid from the air-to-liquid heat exchanger is used to improve the thermal condition of a ground heat exchanger while source fluid for the heat pump is obtained from another ground heat exchanger.

3 Claims, 10 Drawing Sheets

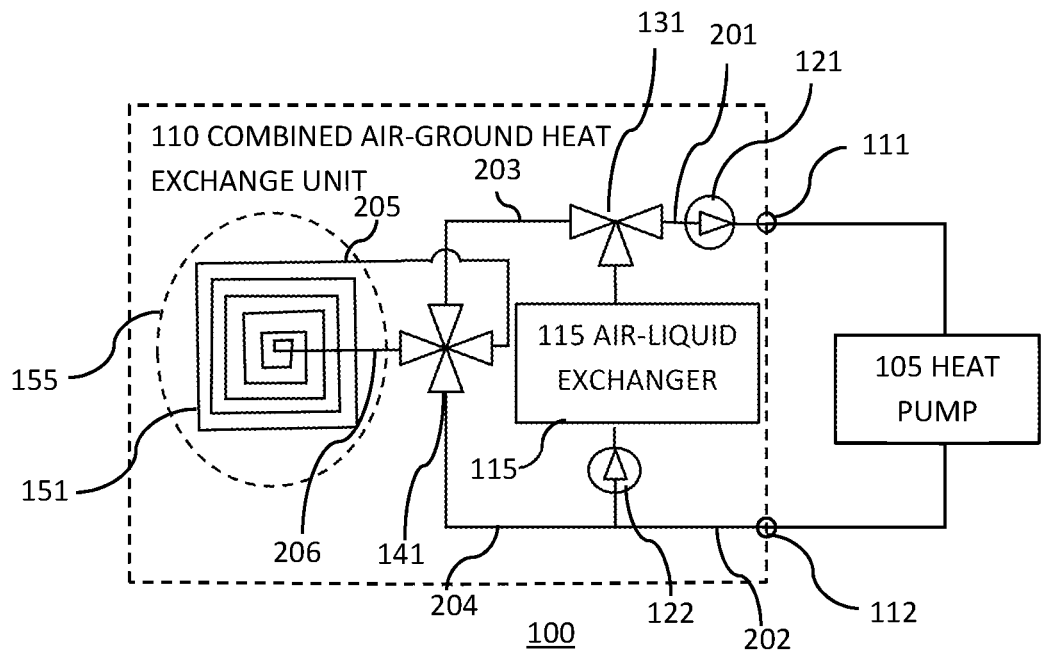
FIG. 3 A
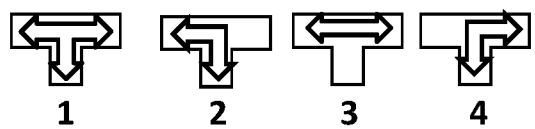
FIG. 3 B
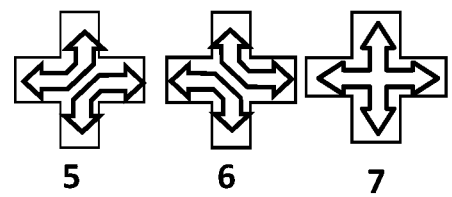
FIG. 3 C
| | T-PORT VALVE 131 | 4-PORT VALVE 141 | PUMP 1 121 | PUMP 2 122 |
|---|---|---|---|---|
| AIR SOURCE MODE | 4 | 5 OR 6 | ON | ON |
| GROUND SOURCE MODE 1 | 3 | 5 | ON | OFF |
| GROUND SOURCE MODE 2 | 3 | 6 | ON | OFF |
| PRECONDITIONING MODE 1 | 2 | 5 | OFF | ON |
| PRECONDITIONING MODE 2 | 2 | 6 | OFF | ON |
| PARALLEL MODE 1 | 1 | 5 | ON | 1/2 ON |
| PARALLEL MODE 2 | 1 | 6 | ON | 1/2 ON |
FIG. 3 D

| | T-PORT VALVE 1 131 | L-PORT VALVE 2 132 | 4-PORT VALVE 141 | | PUMP 1 121 | PUMP 2 122 |
|---|---|---|---|---|---|---|
| AIR SOURCE MODE | 4 | ANY | 5 OR 6 | | ON | ON |
| GROUND SOURCE MODE 1 | 3 | 4 | 5 OR 6 | | ON | OFF |
| GROUND SOURCE MODE 2 | 3 | 2 | 5 OR 6 | | ON | OFF |
| GROUND SOURCE MODE 3 | 3 | 0 | 5 OR 6 | | ON | OFF |
| PRECONDITIONING MODE 1 | 2 | 4 | 5 OR 6 | | OFF | ON |
| PRECONDITIONING MODE 2 | 2 | 2 | 5 OR 6 | | OFF | ON |
| PRECONDITIONING MODE 3 | 2 | 0 | 5 OR 6 | | OFF | ON |
| PARALLEL MODE 1 | 1 | 4 | 5 OR 6 | | ON | 1/2 ON |
| PARALLEL MODE 2 | 1 | 2 | 5 OR 6 | | ON | 1/2 ON |
| PARALLEL MODE 3 | 1 | 0 | 5 OR 6 | | ON | 1/2 ON |

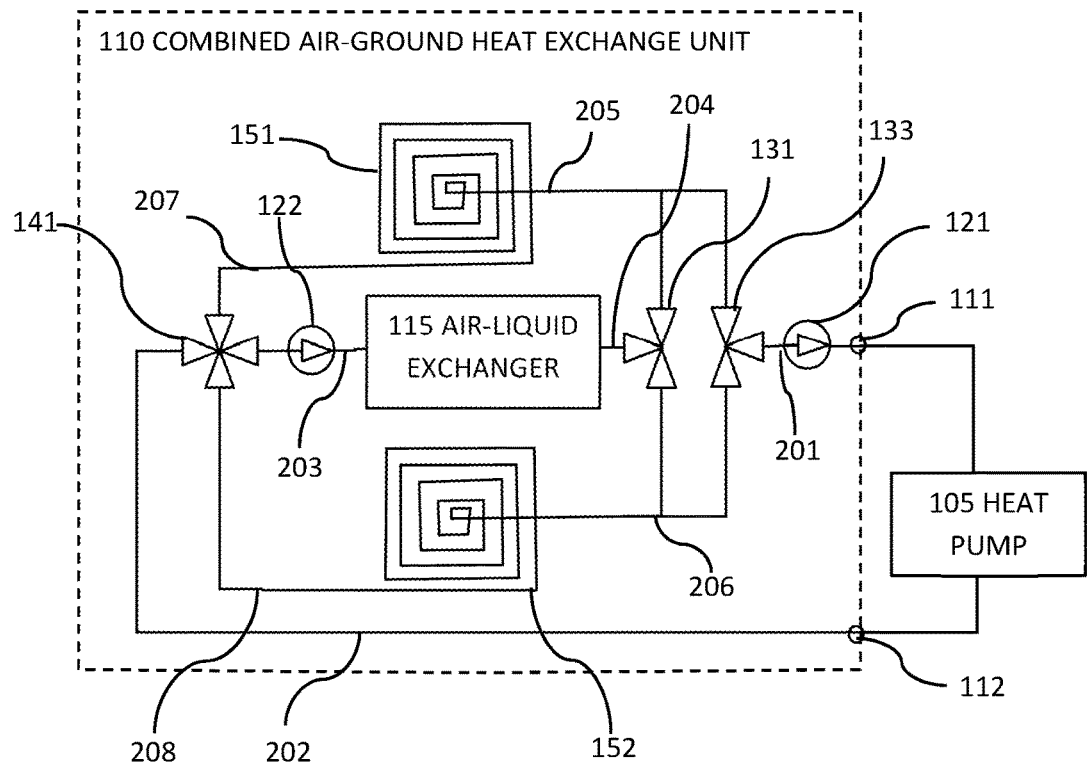

FIG. 6 A

| | T-PORT VALVE 1 131 | T-PORT VALVE 2 133 | 4-PORT VALVE 141 | | PUMP 1 121 | PUMP 2 122 |
|---|---|---|---|---|---|---|
| AIR SOURCE MODE | 1 | 1 | 7 | | ON | ON |
| GROUND SOURCE MODE 1&2 | 3 | 1 | 7 | | ON | OFF |
| GROUND SOURCE MODE 151 | 4 | 4 | 5 | | ON | OFF |
| GROUND SOURCE MODE 152 | 2 | 2 | 6 | | ON | OFF |
| PRECONDITIONING MODE 1&2 | 1 | 3 | 7 | | OFF | ON |
| PRECONDITIONING MODE 151 | 2 | 2 | 6 | | OFF | ON |
| PRECONDITIONING MODE 152 | 4 | 4 | 5 | | OFF | ON |
| PARALLEL MODE 1&2 | 1 | 1 | 7 | | ON | 1/2 ON |
| PARALLEL MODE 151 | 2 | 4 | 7 | | ON | 1/2 ON |
| PARALLEL MODE 152 | 4 | 2 | 7 | | ON | 1/2 ON |
| SIMULTANEOUS MODE 151 1/2 flow | 2 | 4 | 7 | | 1/2 ON | ON |
| SIMULTANEOUS MODE 152 1/2 flow | 4 | 2 | 7 | | 1/2 ON | ON |
| SIMULTANEOUS MODE 151 | 2 | 2 | 6 | | ON | ON |
| SIMULTANEOUS MODE 152 | 4 | 4 | 5 | | ON | ON |

FIG. 6 B

SYSTEM AND METHOD FOR PROVIDING USEABLE SOURCE FLUID

CROSS-REFERENCE TO RELATED APPLICATIONS

This application claims priority to U.S. 62/766,131 filed on Oct. 4, 2018 by Gaylord Olson entitled "Hybrid water and air source heat pump system and method", and to U.S. 62/909,607 entitled "System for Circulating Heat Pump Source Fluid" filed on Oct. 2, 2019 by Gaylord Olson, the contents of both of which are fully incorporated herein by reference.

BACKGROUND OF THE INVENTION

(1) Field of the Invention

The invention relates to systems and method for providing source fluid for heating or cooling, and particularly for providing source fluid useable by heating or cooling units such as heat pumps. The useable source fluid is preferably conditioned using thermal exchange and storage units that interact with one or more thermal sources and sinks such as, but not limited to, ambient air, the earth and solar thermal collectors. More particularly, the present invention relates to the use of multiple thermal exchange and storage unit types to optimize the overall efficiency, cost and life times of such heating and cooling systems, and most particularly to the topological and operational configurations of such systems that enable them to be constructed cost effectively and operated efficiently.

(2) Description of the Related Art

The technical problem of providing efficient, cost effective thermal exchange systems for the heating or cooling of buildings is inherent in the technical field of mechanical engineering for indoor and vehicular comfort.

For instance, many homes, offices and other buildings utilize heat pump systems to heat and/or cool the building. The heat pump utilizes a refrigeration cycle, i.e., the compression and expansion of a refrigerant, to transfer heat to, or from, the space being heated, or cooled, to a source, or sink, of heat. The thermal source, or sink, is typically linked to the heat pump via a source fluid that circulates through appropriate plumbing. The source fluid is typically a fluid having a temperature that allows it to either be used directly for heating or cooling of the building, or to improve the efficiency of the heat pumps.

Usable source fluid, i.e., source fluid having, among other properties, an appropriate temperature, may be obtained by thermal exchange with a suitable heat source or sink, such as, but not limited to, the ambient air, the ground, a solar thermal collector, or some combination thereof. The source fluid may directly cool or heat the building, or it may be used in conjunction with another device such as, but not limited to, a heat pump.

So called ground source, or geothermal, heat pump systems typically utilize the ground under or near the building, either as a heat source or as a heat sink. Air source heat pumps utilize the ambient atmosphere either as a heat source or as a heat sink. By using the earth or atmosphere as a heat source/heat sink, the heat pump can be made more efficient, as most of the energy for cooling or heating may be taken from the heat source or sink. For instance, when used to heat a space, a heat pump may be two to three times more efficient than using a resistance heater, i.e., the amount of electricity that would be required to provide the same thermal energy to the room using a resistance electrical heater would be two to three times as much as the electricity needed to run the compression and expansion cycle of the heat pump. Consequently, heat pump systems may provide an economical solution to many heating and cooling needs.

Heat pump systems that can operate in multiple heating and cooling modes while combining the best features of both ground source heat pumps and air source heat pumps have been envisaged, and are described in more detail in, for instance, U.S. Pat. No. 8,701,432 issued to Olson on Apr. 22, 2014 entitled "System and method of operation and control for a multi-source heat pump", and U.S. Pat. No. 8,726,682 issued to Olson on May 20, 2014 entitled "Hybrid multi-mode heat pump system", both of which are hereby incorporated by reference in their entirety.

In such systems, the selection of the operating mode may be automatically controlled in order to optimize efficiency, depending upon environmental conditions and system needs. They may also enable the heat pump to operate with other HVAC equipment, such as solar thermal panels, therein making the heat pump system more versatile and cost effective However, to make such systems economical to construct, attention needs to be given to the equipment being used to supply the heat pump source fluid, to the topology of the plumbing arrangements that provide the link between the thermal sources and sinks, and the heat pumps, and to the modes in which the systems are used. What is needed are topologies that minimize, for instance, the equipment and plumbing required to connect the thermal sources to one or more heat pumps, thereby facilitating low cost construction, and efficient operation, of such systems, while not compromising the versatility of the systems. These then need to be operated in the appropriate modes at the appropriate time.

The relevant prior art includes:

U.S. Pat. No. 8,701,432 issued to Olson on Apr. 22, 2014 entitled "System and method of operation and control for a multi-source heat pump" that describes a heat pump system having a heat pump unit that operates upon a heat exchange fluid. A ground heat exchanger and an ambient heat exchanger are provided. A first valve set is coupled to the heat pump unit, the ground heat exchanger and the ambient heat exchanger. The first valve set can interconnect the input of the heat pump to the ground heat exchanger or to the ambient heat exchanger. The first valve set can also interconnect the ground heat exchanger to the ambient heat exchanger. A second valve set is provided that interconnects the output of the heat pump unit to the ground heat exchanger or to the ambient heat exchanger. The second valve set can also interconnect the ground heat exchanger to the ambient heat exchanger. The multiple modes are offered by the first valve set and the second valve set.

U.S. Pat. No. 8,726,682 issued to Olson on May 20, 2014 entitled "Hybrid multi-mode heat pump system" that describes a hybrid multi-source system that is used to heat or cool a building. The system utilizes a heat pump or similar HVAC unit. A solar/air heat exchanger is provided. At least one ground heat exchanger is utilized. A plumbing network interconnects the heat pump, the solar/air heat exchanger, and the ground heat exchanger. A heat transfer fluid circulates through the plumbing network. Temperature sensors are used to monitor temperatures of the heat transfer fluid at multiple points in the system. At least one pump circulates the heat transfer fluid through the plumbing network. Valves are disposed within the plumbing network that can selectively isolate the heat pump, the solar/air heat exchanger, and the ground heat exchanger. A systems controller is coupled to the temperature sensors, the valves, and pump. The system operates in multiple modes which allow for higher efficiency and long term underground thermal storage.

U.S. Pat. No. 4,012,920 issued to Kirschbaum on Mar. 22, 1977 entitled "Heating and cooling system with heat pump and storage" that describes a heating and cooling system which includes a reversible heat pump with three refrigerant coils, one of which is in an air duct for the space to be served, another of which is in heat exchange relation with outdoor air, and a third of which is adapted to exchange heat with a heat exchange fluid which is circulated from a heat storage location, the system including valve means in the refrigerant lines for connecting any of the three coils to operate as either an evaporator or a condenser and for connecting either one of the other two coils to operate as a condenser or evaporator, respectively, so that heat can be exchanged in any combination between air in the duct serving the space to be heated, outside air, and the storage fluid. The system also preferably includes a solar collector and a second fluid storage tank, and circulating means and fluid valve means as well as a fluid-to-air heat exchanger in the duct so that heat from solar insolation may be used to heat directly or placed in storage, or heat may be provided for the space directly from the storage. Heat from storage may also be used with the heat pump operating. Various other modes of heat pump operation are also available in a cooling operation. The system also includes the provision of a diverting valve arrangement for the three coil heat pump which precludes, through a physical blocking arrangement, the possibility of short circuiting the discharge from the refrigerant compressor to the suction side of the compressor.

U.S. Pat. No. 5,461,876 issued to Dressler on Oct. 31, 1995 entitled "Combined ambient-air and earth exchange heat pump system" that describes an improved combined ambient-air and earth exchange heat pump system that includes a subterranean heat exchanger and an ambient-air heat exchanger, both refrigerant-based, which are adapted to be selectively operated individually, serially or in parallel for heating and cooling purposes. The system also includes a compressor, a dynamic load heat exchanger, a reversing valve for converting the system from heating to cooling and vice versa, storage for excess refrigerant including an accumulator, an optional preheat exchanger, a regulating assembly with bleed port arrangement, a bypass mechanism for repetitive start-up attempts, and a lost charge device. A control center is provided to automatically activate the ambient-air heat exchanger to assist the subterranean heat exchanger after thermal stressing about the latter, to automatically deactivate the ambient-air heat exchanger for ambient conditions below a preset temperature, to increase or decrease the number of tubes used by the subterranean heat exchanger, and to optionally maintain the flow of refrigerant through the subterranean heat exchanger in the same direction during both the heating mode and the cooling mode.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive system and method for providing useable source fluid is disclosed. Useable source fluid may be fluid, typically a liquid, that is at an appropriate temperature to either be used directly for heating or cooling a space, or used to improve the efficiency of units, such as heat pumps, that are being used to heat or cool a space.

In a preferred embodiment, useable source fluid may be obtained using a thermal exchange unit and/or one or more thermal exchange and storage units. These units, and appropriate source fluid conduits and other hydraulic components, may be connected in one or more of a variety of configurations to provide usable source fluid to a source fluid utilizing unit.

The source fluid utilizing unit may, for instance, be a heat pump. The thermal exchange unit (TXU) may, for instance, be an air-to-liquid heat exchanger, or some similar unit such as, but not limited to, a solar thermal collector, while the thermal exchange and storage unit (TXS) may, for instance, be a ground heat exchanger such as, but not limited to, a geothermal borehole.

In a first configuration, the hydraulic components may be arranged such that the usable source fluid is supplied exclusively from the thermal exchange unit to the source fluid utilizing unit, i.e., it may, for instance, be supplied exclusively from an air-to-liquid heat exchanger to a heat pump. Such a mode of operation may be characterized as an air source mode as the primary sink or source of the thermal energy is the ambient air. The efficiency of this mode of operation is, therefore, dependent on the ambient air temperature which may vary significantly both diurnally and seasonally.

In a second configuration, the hydraulic components may be arranged such that the usable source fluid is supplied exclusively from the thermal exchange and storage unit to the source fluid utilizing unit, i.e., it may, for instance, be supplied exclusively from a ground heat exchanger to a heat pump. Such a mode of operation may be characterized as a ground source mode as the primary sink or source of the thermal energy is the ground. The efficiency of this mode of operation is, therefore, dependent on the ground temperature which may be reasonably stable both diurnally and seasonally.

In a third configuration, the hydraulic components may be arranged such that the usable source fluid is supplied from the thermal exchange unit to the thermal exchange and storage unit, i.e., it may, for instance, be supplied from an air-to-liquid heat exchanger to a ground heat exchanger. Such a mode of operation may be characterized as a preconditioning mode as the air-to-liquid heat exchanger may be preconditioning the ground heat storage region. Such a preconditioning mode may be useful to counter the effects of depletion. If, for instance, a thermal exchange and storage unit (TXS) such as a ground heat storage region, is used continually for cooling, its temperature may rise as it absorbs heat. This may be countered by, when appropriate, cooling it using cooled source fluid from the thermal exchange unit (TXU), that may be an air-to-liquid heat exchanger.

In a fourth configuration, the hydraulic components may be arranged such that the usable source fluid is supplied from both the thermal exchange unit and the thermal exchange and storage unit to the source fluid utilizing unit, i.e., it may, for instance, be supplied from both an air-to-liquid heat exchanger and a ground heat exchanger to a heat pump. Such a mode of operation may be characterized as a parallel mode. The efficiency of this mode of operation stems from the fact that the degree to which the source fluid can exchange thermal energy with a source or sink depends on the flow rate of the fluid. The slower the flow rate, the more effective the energy exchange is. In a parallel mode, the fluid flow rate through each of the thermal exchange units may, for instance, only be half that if each were used individually. By operating in the parallel mode the overall efficiency of the system may, therefore, be improved.

In a fifth configuration, the hydraulic components may be arranged such that both an air-source mode and a preconditioning mode may be operated simultaneously. Such a mode of operation may be termed a simultaneous mode.

A variety of topological configurations that allow these modes to be implemented are described in more detail below, as well as operational parameters that allow for appropriate and efficient switching between such modes.

Therefore, the present invention succeeds in conferring the following, and others not mentioned, desirable and useful benefits and objectives.

It is an object of the present invention to identify and provide suitable components and topological system layouts so as to enable a cost effective supply of useable source fluid.

It is another object of the present invention to provide methods of operating such systems efficiently.

It is a further object of the present invention to provide a system for circulating heat pump source fluid that allows the use of both an air-to-liquid heat exchanger and one or more ground heat exchangers to efficiently and effectively extract or supply thermal energy via a heat pump.

It is another object of the present invention to provide such a system in a topological configuration that is both cost effective to construct and provides efficient operation of the heat pump.

Yet another object of the present invention is to provide a system that allows multiple heat pumps to be connected to a single combined air-ground heat exchange unit in a way that is both cost effective to construct and provides efficient operation of the heat pumps.

BRIEF DESCRIPTION OF THE SEVERAL VIEWS OF THE DRAWINGS

FIG. 3A shows a schematic representation of a system for circulating heat pump source fluid incorporating a single ground heat exchanger and an air-to-liquid heat exchanger of one embodiment of the present invention.

FIG. 3B shows a schematic representation of the flow of fluid through a T-port valve for particular settings of the valve.

FIG. 3C shows a schematic representation of the flow of fluid through a 4-port reversing valve for particular settings of the valve.

FIG. 3D shows a table giving the valve and pump settings required to obtain operational modes possible using the system topology shown in FIG. 3A.

FIG. 6A shows a schematic representation of a system for circulating heat pump source fluid incorporating two ground heat exchangers and an air-to-liquid heat exchanger of a further embodiment of the present invention.

FIG. 6B shows a table giving the valve and pump settings required to obtain operational modes possible using the system topology shown in FIG. 6A.

DETAILED DESCRIPTION OF THE INVENTION

Figure 1:
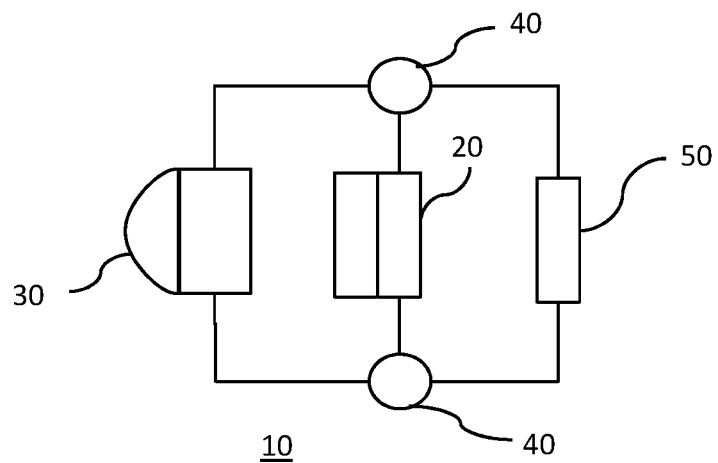
FIG. 1 shows a schematic representation of a system for providing useable source fluid incorporating both a thermal exchange unit (TXU) and a thermal exchange and storage unit (TXS) of one embodiment of the present invention.
Figure 2A:
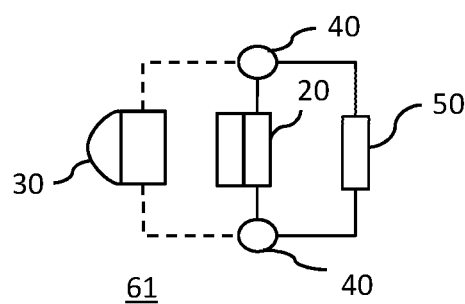
FIG. 2A shows a schematic representation of the system of FIG. 1 in a first set of configurations.
Figure 2B:
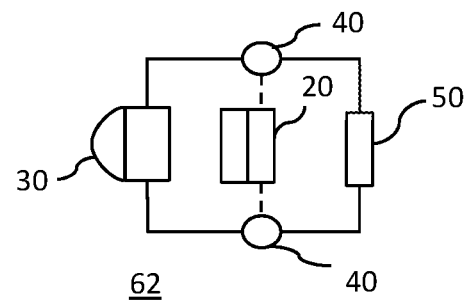
FIG. 2B shows a schematic representation of the system of FIG. 1 in a second set of configurations.
Figure 2C:
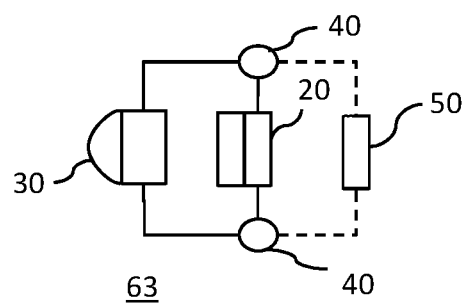
FIG. 2C shows a schematic representation of the system of FIG. 1 in a third set of configurations.
Figure 2D:
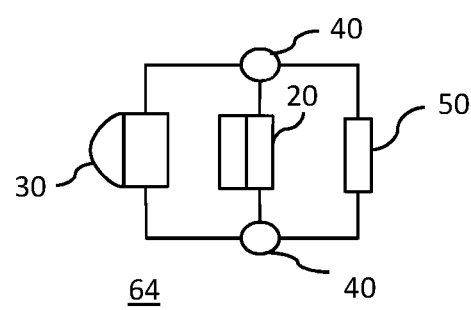
FIG. 2D shows a schematic representation of the system of FIG. 1 in a fourth set of configurations.

The preferred embodiments of the present invention will now be described in more detail with reference to the drawings in which identical elements in the various figures are, as far as possible, identified with the same reference numerals. These embodiments are provided by way of explanation of the present invention, which is not, however, intended to be limited thereto. Those of ordinary skill in the art may appreciate upon reading the present specification and viewing the present drawings that various modifications and variations may be made thereto without departing from the spirit of the invention.

FIG. 1 shows a schematic representation of a system for providing useable source fluid incorporating both a thermal exchange unit (TXU) and a thermal exchange and storage unit (TXS) of one embodiment of the present invention.

As shown in FIG. 1, the thermal exchange unit (TXU) 20, the thermal exchange and storage unit (TXS) 30 and the source fluid utilizing unit 50 may be connected by hydraulic components 40. An objective of the arrangement may be to provide useable source fluid from either or both of the thermal exchange units to the source fluid utilizing unit. In a typical system, the source fluid may be water with an antifreeze additive such as, but not limited to, propylene glycol, an alcohol, or some combination thereof. The source fluid may be made useable source fluid by heating or cooling it to an appropriate temperature. The source fluid may then be used, either directly for heating or cooling a space, or to improve the efficiency of units, such as heat pumps, that are being used to heat or cool a space.

In a preferred embodiment, the source fluid may be rendered useable by means of a thermal exchange unit and/or one or more thermal exchange and storage units. The source fluid flow between these units may be via hydraulic connections. These hydraulic connections may have topologies that may be flexibly configured in a variety of modes that may function to, for instance, provide the usable source fluid to a source fluid utilizing unit.

The source fluid utilizing unit may, for instance, be a heat pump.

The thermal exchange unit (TXU) may, for instance, be an air-to-liquid heat exchanger, or some related unit such as, but not limited to, a solar thermal collector.

The thermal exchange and storage unit (TXS) may, for instance, be a ground heat exchanger such as, but not limited to, a geothermal borehole. Other thermal exchange and storage units (TXS) 30 include seasonal thermal storage technologies such as, but not limited to, aquifer thermal energy storage, borehole thermal energy storage, cavern or mine thermal energy storage, energy pilings, geo inter-seasonal insulated thermal storage, pit storage, large-scale thermal storage with water, horizontal heat exchangers, earth-bermed buildings, salt hydrate technology, phase change materials, or some combination thereof.

The hydraulic components 40 may be an assortment of pipes, pumps, and monitors, including temperature, flow and pressure monitors, as well as associated control electronics, all adaptable for conveying and controlling the flow of the source fluid, including monitoring and controlling pressures, temperatures and flow rates as appropriate. Such pipes, pumps, monitoring equipment and control electronics are well-known in the field of heating, ventilation, and air conditioning (HVAC) and some representative, specific examples are provided below.

FIG. 2 A shows a schematic representation of the system of FIG. 1 configured to operate in a first mode 61. As shown, the hydraulic components 40 may be configured, or connected, such that the usable source fluid is supplied exclusively from the thermal exchange unit 20 to the source fluid utilizing unit 50, i.e., it may, for instance, be supplied exclusively from an air-to-liquid heat exchanger to a heat pump. Such a mode of operation may be characterized as an air source mode as the primary sink, or source, of the thermal energy is the ambient air. The efficiency of this mode of operation is, therefore, dependent on the ambient air temperature, which may vary significantly both diurnally and seasonally.

FIG. 2 B shows a schematic representation of the system of FIG. 1 configured to operate in a second mode 62. As shown, the hydraulic components 40 may be configured, or connected, such that the usable source fluid is supplied exclusively from the thermal exchange and storage unit 30 to the source fluid utilizing unit 50, i.e., it may, for instance, be supplied exclusively from a ground heat exchanger to a heat pump. Such a mode of operation may be characterized as a ground source mode as the primary sink or source of the thermal energy is the ground. The efficiency of this mode of operation is, therefore, dependent on the ground temperature which may be reasonably stable both diurnally and seasonally.

FIG. 2 C shows a schematic representation of the system of FIG. 1 configured to operate in a third mode 63. As shown, the hydraulic components 40 may be configured, or connected, such that the usable source fluid is supplied from the thermal exchange unit 20 to the thermal exchange and storage unit 30, i.e., it may, for instance, be supplied from an air-to-liquid heat exchanger to a ground heat exchanger. Such a mode of operation may be characterized as a pre-conditioning mode because the air-to-liquid heat exchanger may be preconditioning the ground heat storage region. Such a preconditioning mode may be useful to counter the effects of depletion. If, for instance, a thermal exchange and storage unit (TXS) such as a ground heat storage region, is used continually for cooling, its temperature may rise as it absorbs heat. This may be countered by, when appropriate, cooling it using cooled source fluid from the thermal exchange unit (TXU), that may be an air-to-liquid heat exchanger.

FIG. 2 D shows a schematic representation of the system of FIG. 1 configured to operate in a fourth mode 64. As shown, the hydraulic components 40 may be configured, or connected, such that the usable source fluid is supplied from both the thermal exchange unit 20 and the thermal exchange and storage unit 30 to the source fluid utilizing unit, i.e., it may, for instance, be supplied from both an air-to-liquid heat exchanger and a ground heat exchanger to a heat pump. Such a mode of operation may be characterized as a parallel mode. The efficiency of this mode of operation stems from the fact that the degree to which the source fluid can exchange thermal energy with a source or sink depends, to a significant extent, on the flow rate of the fluid as it interacts with the source or sink. The slower the flow rate, the more effective the energy exchange. In a parallel mode, the fluid flow rate through each of the thermal exchange units may, for instance, b only be half that if each were used individually. By operating in the parallel mode the overall efficiency of the system may, therefore, be improved.

FIG. 3 A shows a schematic representation of a system for circulating heat pump source fluid incorporating a single ground heat exchanger and an air-to-liquid heat exchanger of one embodiment of the present invention.

In the embodiment of the present invention shown in FIG. 3 A, source fluid obtained from, or conditioned by, a combined air-ground heat exchange unit 110 may be linked, or hydraulically connected, to a heat pump 105 via an exit point 111 and an entry point 112

As shown, the combined air-ground heat exchange unit 110 may include both an air-to-liquid heat exchanger 115 and a first ground heat exchanger 151, as well as two fluid circulating pumps 121 and 122, a T-port valve 131, and a four port reversing valve 141.

The topology of the system may be such that multiple modes of operation may be achieved. In particular, the system may be configurable to perform one or more of the following source fluid circulating modes:

An air source mode in which source fluid may be conditioned by the air-to-liquid heat exchanger 115 and then circulated to the heat pump 105;

A ground source mode in which source fluid may be conditioned by the ground heat exchanger 151 and then circulated to the heat pump 105;

A preconditioning mode in which source fluid may be conditioned by the air-to-liquid heat exchanger 115 and then circulated to the ground heat exchanger 151 in order to precondition the ground heat exchanger, i.e., to store thermal energy in the ground heat storage region 155 that may surround the ground heat exchanger; and A parallel mode in which source fluid may be circulated to the heat pump 105 after being conditioned by thermal exchange with both the air-to-liquid heat exchanger 115 and the ground heat exchanger 151.

A plumbing topology that may allow the combined air-ground heat exchange unit 110 components to be configured to achieve these modes of operation is shown in FIG. 3 A.

This topology may, for instance, be made up of the following fluid conduits:

A first source fluid conduit 201 that may hydraulically connect the air-to-liquid heat exchanger 115 to the exit point 111 via the first T-port valve 131, and the first fluid circulating pump 121;

A second source fluid conduit 202 that may hydraulically connect the air-to-liquid heat exchanger 115 to the entry point 112 via said second fluid circulating pump 122;

A third source fluid conduit 203 that may hydraulically connect the air-to-liquid heat exchanger 115 to a first port of a four port reversing valve 141 via the first T-port valve 131;

A fourth source fluid conduit 204 that may hydraulically connect the air-to-liquid heat exchanger 115 to a third port of the four port reversing valve 141 via the second fluid circulating pump 122;

A fifth source fluid conduit 205 that may hydraulically connect the first ground heat exchanger 151 to a second port of the four port reversing valve 141; and A sixth source fluid conduit 206 that may hydraulically connect the first ground heat exchanger 151 to a fourth port of the four port reversing valve 141.

FIG. 3 B shows a schematic representation of the flow of fluid through a T-port valve for particular settings of the valve.

In setting "1", the valve is open and fluid may flow from any of the three ports of the valve to any of the other ports.

In setting "2", the valve is open to allow fluid to flow between a 1st and a 2nd port, or as it is sometimes referred to, to flow from West to South, and vice versa.

In setting "3", the valve is open to allow fluid to flow between a 1st and a 3rd port, or as it is sometimes referred to, to flow from West to East, and vice versa.

In setting "4, the valve is open to allow fluid to flow between a 2nd and a 3rd port, or as it is sometimes referred to, to flow from East to South, or vice versa.

FIG. 3 C shows a schematic representation of the flow of fluid through a 4-port reversing valve for particular settings of the valve.

In setting "5", the valve is open to flow from a 1st port to a 4th port, and from a 2nd port to a 3rd port, i.e., to flow West to North and East to South, or vice versa.

In setting "6", the valve is open to flow from a 1st port to a 2nd port, and from a 3rd port to a 4th port, or West to South and East to North, or vice versa.

In setting "7", the valve is open to flow from any port to any other port.

FIG. 3 D shows a table giving the valve and pump settings required to obtain operational modes possible using the system topology shown in FIG. 3A.

As shown, to achieve an air source mode, T-port valve 131 may be placed in setting "4", allowing source fluid to be pumped along a first source fluid conduit 201, by the first fluid circulating pump 121, from the air-to-liquid heat exchanger 115 to the heat pump 105 via the exit point 111. Source fluid may then be pumped back to the air-to-liquid heat exchanger 115 via second source fluid conduit 202. The first four port reversing valve 141 may be in any setting as no source fluid flows through it due to the first and second pumps both operating to move the same volume of fluid, and the first T-port valve 131 in setting "4" prevents flow of the source fluid from the first ground heat exchanger 151.

To achieve a ground source mode, T-port valve 131 may be placed in setting "3", and the four port reversing valve 141 in either the "5" or the "6" setting.

With the four port reversing valve 141 in setting "5", source fluid may be directed from the center of the first ground heat exchanger 151 to the heat pump 105 and back via the periphery of the ground heat exchanger. If the first ground heat exchanger 151 is a flat spiral loop near the surface of the ground, it may form a ground heat storage region 155 that may be a hemisphere. The center of such a flat spiral loop ground heat exchanger may, therefore, be at the extreme temperature, i.e., warmest if the ground heat storage region 155 has been preconditioned to be warm, or coldest if it has been preconditioned to be cold. As it is typically advantageous to supply the heat pump with the coldest when cooling, or hottest when heating, ground source mode 1 may be the most advantageous. There may, however, be situations in which it is desirable to use ground source mode 2, in which the four port reversing valve 141 is in setting "6", and source fluid flows from the periphery of a flat spiral ground heat exchanger.

Similarly, in preconditioning mode 1, with the four port reversing valve 141 in setting "5", a flat spiral ground heat exchanger would be preconditioned by sending source fluid to the center which may be the optimum for preconditioning.

The same may be true of the parallel modes, with parallel mode 1 having source fluid flowing from the center of a flat spiral heat exchanger. In both parallel modes, the ratio of fluid flowing from the ground source exchanger and from the air-liquid exchanger may be controlled by the ratio of the pumping speeds of the two pumps. For instance, with the second fluid circulating pump 122 operating at half the flow rate of first fluid circulating pump 121, the amount of source fluid flowing through the ground heat exchanger and the air-to-liquid heat exchanger may be approximately equal.

The ground heat exchanger may, for instance, be a flat, spiral ground heat exchanger, a trench ground heat exchanger, or a borehole ground heat exchanger.

Figure 4:
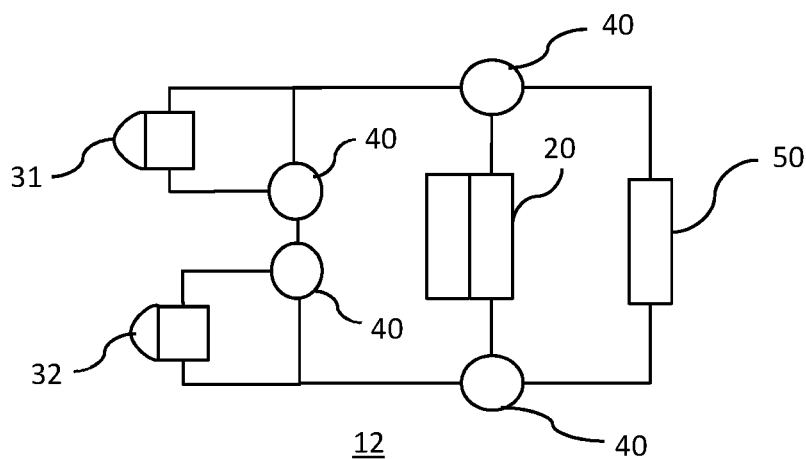
FIG. 4 shows a schematic representation of a system for providing usable source fluid having a thermal exchange unit (TXU) and two thermal exchange and storage unit (TXS) of one embodiment of the present invention.

FIG. 4 shows a schematic representation of a system for providing usable source fluid having a thermal exchange unit (TXU) 20 and two thermal exchange and storage units (TXS) 31, 32 of one embodiment of the present invention. The thermal exchange unit (TXU) 20, the first thermal exchange and storage unit (TXS) 31 and the second thermal exchange and storage unit (TXS) 32 may be linked to each other and to the source fluid utilizing unit 50 by the hydraulic components 40.

Figure 5:
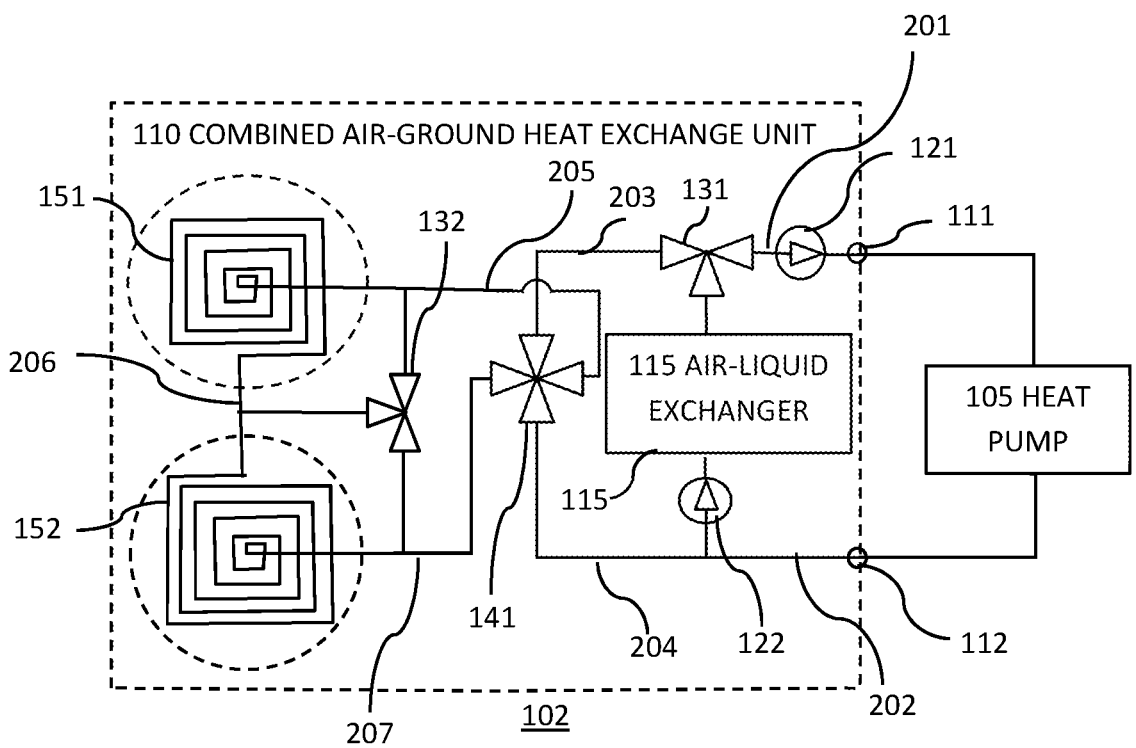
FIG. 5A shows a schematic representation of a system for circulating heat pump source fluid incorporating two ground heat exchangers and an air-to-liquid heat exchanger of one embodiment of the present invention.
FIG. 5B shows a schematic representation of the flow of fluid through an L-port valve for particular settings of the valve.
FIG. 5C shows a table giving the valve and pump settings required to obtain operational modes possible using the system topology shown in FIG. 5A.
Figure 5:
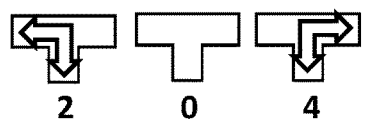

FIG. 5 A shows a schematic representation of a system for circulating heat pump source fluid incorporating two ground heat exchangers and an air-to-liquid heat exchanger of one embodiment of the present invention. The topology of FIG. 5 A may be one instantiation of the embodiment of the invention shown schematically in FIG. 4.

In this further preferred embodiment of the invention, the combined air-ground heat exchange unit 110 may now incorporate a second ground heat exchanger 152 and an L-port valve 132. The topological layout may be such that the system can be cost effectively constructed and installed, and, by a suitable selection of valve and pump settings, the system may also operate in one or more of the following modes, in addition to those detailed above:

A ground source mode in which source fluid is circulated from either, or both, of the ground heat exchangers to the heat pump 105;

A preconditioning mode in which source fluid may be circulated from the air-to-liquid heat exchanger 115 to either, or both, of the ground heat exchangers; and A parallel mode in which source fluid may be circulated to the heat pump 105 from either or both of the ground heat exchangers, and, simultaneously, from the air-to-liquid heat exchanger.

An advantage of such a dual ground heat exchanger system may be that one of them may be pre-conditioned to be a warm storage area, or a source of thermal heat, while the other may be preconditioned to be a cooler storage area, or a sink of thermal heat. Such an arrangement may, for instance, allow the system to be operated more efficiently over a wider range of environmental conditions. In such a system, each of the ground heat exchangers may be a flat, spiral ground heat exchanger, a trench ground heat exchanger, or a borehole heat exchanger.

The topology to achieve these extra modes of operation may include the following:

The fifth source fluid conduit 205 may now connect an output of the first ground heat exchanger 151 to a second port of the first four port reversing valve 141 as well as to a first port of L-port valve 132;

The sixth source fluid conduit 206 may now connect an output of the first ground heat exchanger 151 to an input of the second ground heat exchanger 152 and to a second port of the L-port valve 132; and, A seventh source fluid conduit 207 may now connect an output of the second ground heat exchanger 152 to a third port of the L-port valve 132.

FIG. 5 B shows a schematic representation of the flow of fluid through an L-port valve for particular settings of the valve.

In setting 2, the L-port valve is open to flow from port 1 to port 2, i.e., from west to south, or vice versa.

In setting 0, the L-port valve is shut, and no flow occurs.

In setting 4, the L-port valve is open to flow from port 3 to port 2, i.e., from east to south, or vice versa.

FIG. 5 C shows a table giving the valve and pump settings required to obtain operational modes possible using the system topology shown in FIG. 5 A.

As shown, to achieve an air source mode, T-port valve 131 may be placed in setting "4", allowing source fluid to be pumped along a first source fluid conduit 201, by the first fluid circulating pump 121, from the air-to-liquid heat exchanger 115 to the heat pump 105 via the exit point 111. Source fluid may then be pumped back to the air-to-liquid heat exchanger 115 via second source fluid conduit 202. The first four port reversing valve 141 may be in any setting as no source fluid flows through it due, in part, to the first and second pumps both operating to move the same volume of fluid, and the first T-port valve 131 in setting "4" prevents flow from the four port reversing valve 141. Similarly, the L-port valve 132 may be in either setting as no fluid flows through it.

To achieve a first ground source mode, in which source fluid is conditioned solely by first ground heat exchanger 151, T-port valve 131 may be placed in setting "3", the four port reversing valve 141 in either the "5" or the "6" setting, and the L-port valve 132 in setting "4".

With the four port reversing valve 141 in setting "5", source fluid may be directed from the periphery of first ground heat exchanger 151 via the L-port valve 132 in setting "4", the four port reversing valve 141 in setting "5, the T-port valve 131 in setting "3" and the first fluid circulating pump 121 to the exit point 111 and on to the heat pump 105. The source fluid may then return via the four port reversing valve 141 to the center of the first ground heat exchanger 151.

With the four port reversing valve 141 in setting "6", source fluid may be directed from the center of first ground heat exchanger 151 via the four port valve in setting "6", the T-port valve 131 in setting "3" and the first fluid circulating pump 121 to the exit point 111 and on to the heat pump 105. The source fluid may then return via the four port reversing valve 141 and the L-port valve 132 to the periphery of the first ground heat exchanger 151.

To achieve a second ground source mode, in which source fluid is conditioned solely by the second ground heat exchanger 152, T-port valve 131 may be placed in setting "3", the four port reversing valve 141 in either the "5" or the "6" setting, and the L-port valve 132 in setting "2". In analogy with the paths for the first ground source mode, the source fluid may circulate to the heat pump either from the center or the periphery of the second ground heat exchanger 152, dependent on the setting of the first four port reversing valve 141.

A third ground source mode, in which source fluid is conditioned by both the first and second ground heat exchangers may be obtained by placing the L-port valve 132 in setting "0", in which no fluid flows through it, the T-port valve 131 in setting "3" and the four port reversing valve 141 in either setting "5" or "6", dependent on which direction the source fluid is to flow through the ground sources.

Similarly, there are three sets of preconditioning modes, in all of which the T-port valve 131 is placed in setting "2" so that source fluid always flows from the air-to-liquid heat exchanger 115 to the first port of the four port reversing valve 141.

To precondition only the first ground heat exchanger 151, L-port valve 132 may be placed in setting "4". The preconditioning may then be into the center, with four port reversing valve 141 in setting "6", or into periphery with four port reversing valve 141 in setting "5".

To precondition only the second ground heat exchanger 152, L-port valve 132 may be placed in setting "2". The preconditioning may then be into the center, with four port reversing valve 141 in setting "5", or into the periphery with four port reversing valve 141 in setting "6".

Both the first and second ground heat exchangers may be preconditioned together by placing L-port valve 132 in setting "0" so no fluid flows through it. The preconditioning may then start with first ground heat exchanger 151 by placing the four port reversing valve 141 in setting "6", or from the second ground heat exchanger 152 by placing the four port reversing valve 141 in setting "5".

Similarly, there are three sets of parallel modes, in all of which the T-port valve 131 is placed in setting "1" so that source fluid always flows both from the air-to-liquid heat exchanger 115 and from the first port of the four port reversing valve 141. This flow is ensured by having the second fluid circulating pump 122 operate at half the flow rate of first fluid circulating pump 121.

In parallel mode 1, source fluid may flow from both the first ground heat exchanger 151 and the air-to-liquid heat exchanger 115 to the heat pump 105. This may be accomplished by having the L-port valve 132 placed in setting "4" allowing source fluid to flow between the first ground heat exchanger 151 and the third port of the four port reversing valve 141. Then, with the four port reversing valve 141 in setting "6", the flow will be from the center of the first ground heat exchanger 151, while setting "5" will cause the flow to be from the periphery.

In parallel mode 2, source fluid may flow from both the second ground heat exchanger 152 and the air-to-liquid heat exchanger 115 to the heat pump 105. This may be accomplished by placing the L-port valve 132 in setting "2", allowing source fluid to flow between the second ground heat exchanger 152 and the second port of the four port reversing valve 141. Then, with the four port reversing valve 141 in setting "5", the flow will be from the center of the second ground heat exchanger 152, while setting "6" will cause the flow to be from the periphery.

In parallel mode 3, source fluid may flow from both the ground heat exchangers and the air-to-liquid heat exchanger 115 to the heat pump 105. This may be accomplished by placing the L-port valve 132 in setting "0", forcing all flow between the four port reversing valve 141 and the ground heat exchangers to be between the second port of the four port reversing valve 141 and the center of the first ground heat exchanger 151, and the center of the second ground heat exchanger 152 and the third port of the four port reversing valve 141. Then, with the four port reversing valve 141 in setting "6", the flow through the ground heat exchangers may be in a clockwise direction, i.e., from the four port reversing valve 141 to the second ground heat exchanger 152 then the first ground heat exchanger 151 and back to the four port reversing valve 141. Conversely, with the four port reversing valve 141 in setting "5", the flow may be anti-clockwise.

FIG. 6 A shows a schematic representation of a system for circulating heat pump source fluid incorporating two ground heat exchangers and an air-to-liquid heat exchanger of a further embodiment of the present invention.

Although the combined air-ground heat exchange unit 110 shown in FIG. 6 A consists of similar basic elements as that shown in FIG. 5 A, i.e., an air-to-liquid heat exchanger 115, a first ground heat exchanger 151 and a second ground heat exchanger 152, as well as a four port reversing valve 141 and a first fluid circulating pump 121 and a second fluid circulating pump 122, and a first T-port valve 131, it has a second T-port valve 133 instead of an L-port valve 132.

Moreover, the components are connected in a different topology. The connection topology of FIG. 6 A allows additional, so called simultaneous modes to be setup. In these simultaneous modes source fluid may be used to both precondition one of the ground heat exchangers while still providing usable source fluid to a heat pump. This may be accomplished by supplying source fluid from the air-to-liquid heat exchanger 115 to one of the ground heat exchangers, while supplying source fluid from the other ground heat exchanger to the heat pump 105.

As shown in FIG. 6 A, the topology to accomplish this may be as follows:

The heat pump 105 may be connected to an exit point 111 and an entry point 112.

A first source fluid conduit 201 may hydraulically connect that exit point 111 to a second port of the first T-port valve 131 via the first fluid circulating pump 121, while a second source fluid conduit 202 may hydraulically connect the entry point 112 to a fourth port of the four port reversing valve 141.

A third source fluid conduit 203 may hydraulically connect a second port of the four port reversing valve 141 via the second fluid circulating pump 122 to the air-to-liquid heat exchanger 115.

A fourth source fluid conduit 204 may hydraulically connect the air-to-liquid heat exchanger 115 on to a second port of the first T-port valve 131.

A fifth source fluid conduit 205 may hydraulically connect a center tap of the first ground heat exchanger 151 to both a first port of the first T-port valve 131 and to third port of the second T-port valve 133, while a sixth source fluid conduit 206 may hydraulically connect a center tap of the second ground heat exchanger 152 to both a third port of the first T-port valve 131 and to a first port of the second T-port valve 133.

A seventh source fluid conduit 207 may hydraulically connect a peripheral tap of the first ground heat exchanger 151 to a first port of the four port reversing valve 141, while an eighth source fluid conduit 208 may hydraulically connect a peripheral tap of the second ground heat exchanger 152 to a third port of the four port reversing valve 141.

FIG. 6 B shows a table giving the valve and pump settings that may be required to obtain operational modes possible using the system topology shown in FIG. 6 A.

An air source mode may be achieved by placing both the first and second T-port valves in setting "1", i.e., having flow from all ports to all other ports, and four port reversing valve 141 in setting "7", also allowing flow from all ports to all ports. With both the first and second fluid circulating pumps operating at the same flow rate, source fluid may be conditioned in air-to-liquid heat exchanger 115 and then flow via the two T-port valves and the first fluid circulating pump 121 to the exit point 111 which may be connected to a heat pump 105. The source fluid may then flow back from the entry point 112, which may also be connected to the heat pump 105, back via the four port reversing valve 141 and the second fluid circulating pump 122 to the air-to-liquid heat exchanger 115. Because the flow through the two circulating pumps may be equal, no flow may occur through the two ground heat exchangers.

The three ground source modes may be obtained by having the second fluid circulating pump 122 set to "OFF", and the valve settings as detailed below, thereby having no flow through or from from the air-to-liquid heat exchanger 115.

A first ground source mode in which source fluid flows from both the first ground heat exchanger 151 and the second ground heat exchanger 152 may then be obtained by having the first T-port valve 131 in setting 3, the second T-port valve 133 in setting "1" and four port reversing valve 141 in setting "7".

A second ground source mode in which source fluid flows only from the first ground heat exchanger 151 may be obtained by having both the first T-port valve 131 and the second T-port valve 133 in setting "4" and the four port reversing valve 141 in setting "5".

A third ground source mode in which source fluid flows from the second ground heat exchanger 152 may be obtained by having both the first T-port valve 131 and the second T-port valve 133 in setting "2" and four port reversing valve 141 in setting "6".

Similarly, three preconditioning modes may be obtained by having the first fluid circulating pump 121 set to "OFF", and the valve settings detailed below, thereby having no source fluid flow to exit point 111.

A first preconditioning mode in which source fluid flows from the air-to-liquid heat exchanger 115 to both ground heat exchangers may be obtained by placing the first T-port valve 131 in setting "1", the second T-port valve 133 in setting "3" and the four port reversing valve 141 in setting "7".

A second preconditioning mode in which source fluid flows from the air-to-liquid heat exchanger 115 to only the first ground heat exchanger 151 may be obtained by placing both the first T-port valve 131 and the second T-port valve 133 in setting "2", and the four port reversing valve 141 in setting "6".

A third preconditioning mode in which source fluid flows from the air-to-liquid heat exchanger 115 to the second ground heat exchanger 152 may be obtained by placing both the first T-port valve 131 and the second T-port valve 133 in setting "4", and the four port reversing valve 141 in setting "5".

Similarly, three parallel modes may be obtained by having the four port reversing valve 141 in setting "7", and the second fluid circulating pump 122 set to operate at half the flow rate of the first fluid circulating pump 121.

In a first parallel mode, source fluid may flow from both the first and second ground heat exchangers and the air-to-liquid heat exchanger 115 by having both the first and second T-port valves in setting "1".

In a second parallel mode, source fluid may flow from the first ground heat exchanger 151 and the air-to-liquid heat exchanger 115 by having the first T-port valve 131 in setting "2" and second T-port valves in setting "4".

In a third parallel mode, source fluid may flow from the second ground heat exchanger 152 and the air-to-liquid heat exchanger 115 by having the first T-port valve 131 in setting "4" and second T-port valve 133 in setting "2".

The topography of FIG. 6A may also allow the combined air-ground heat exchange unit 110 to operate in four simultaneous modes. The first two may be accomplished by having the four port reversing valve 141 in setting "7", and the first fluid circulating pump 121 operating at half the fluid flow of the second fluid circulating pump 122.

In a first simultaneous mode, source fluid may be conditioned by the air-to-liquid heat exchanger 115 and may then flow to the first ground heat exchanger 151 to precondition it, while source fluid from the second ground heat exchanger 152 flows to the heat pump 105. This may be accomplished by having the first T-port valve 131 in setting "2" while the second T-port valve 133 is in setting "4".

In a second simultaneous mode, source fluid may be conditioned by the air-to-liquid heat exchanger 115 and may then flow to the second ground heat exchanger 152 to pre-condition it, while source fluid from the first ground heat exchanger 151 may be used by the heat pump 105. This may be accomplished by having the first T-port valve 131 in setting "4" while having the second T-port valve 133 in setting "2".

In the next two simultaneous modes, the third and fourth, both pumps may operate at full flow rate.

In the third simultaneous mode, source fluid may be conditioned by the air-to-liquid heat exchanger 115 and may then flow to the first ground heat exchanger 151 to pre-condition it, while source fluid from the second ground heat exchanger 152 may be used by the heat pump 105. This may be accomplished by having both the first T-port valve 131 and the second T-port valve 133 in setting "2" and the four port reversing valve 141 in setting "6.

In the fourth simultaneous mode, source fluid may be conditioned by the air-to-liquid heat exchanger 115 and may then flow to the second ground heat exchanger 152 to pre-condition it, while source fluid from the first ground heat exchanger 151 may be used by the heat pump 105. This may be accomplished by having both the first T-port valve 131 and the second T-port valve 133 in setting "4" and the four port reversing valve 141 in setting "5.

The simultaneous modes may, for instance, be useful on a summer day, when air temperature is higher than the ground temperature of the ground source that will be used for heating. The ground source reserved for cooling may then be used to supply source fluid to the heat pump, while source fluid conditioned by the air-to-liquid heat exchanger may be used to heat the other ground source that may be reserved for heating.

Conversely, it may also be useful on a winter day, when air temperature is lower than the ground temperature of the ground source that will be used for heating. The ground source reserved for heating may then be used to supply source fluid to the heat pump, while source fluid conditioned by the air-to-liquid heat exchanger may be used to cool the other ground source that may be reserved for cooling.

Both of these modes may, for instance, ameliorate the effects of depletion, allowing smaller ground sources to be used, and so prolong operational life of ground sources while reducing the costs of constructing them.

Figure 7:
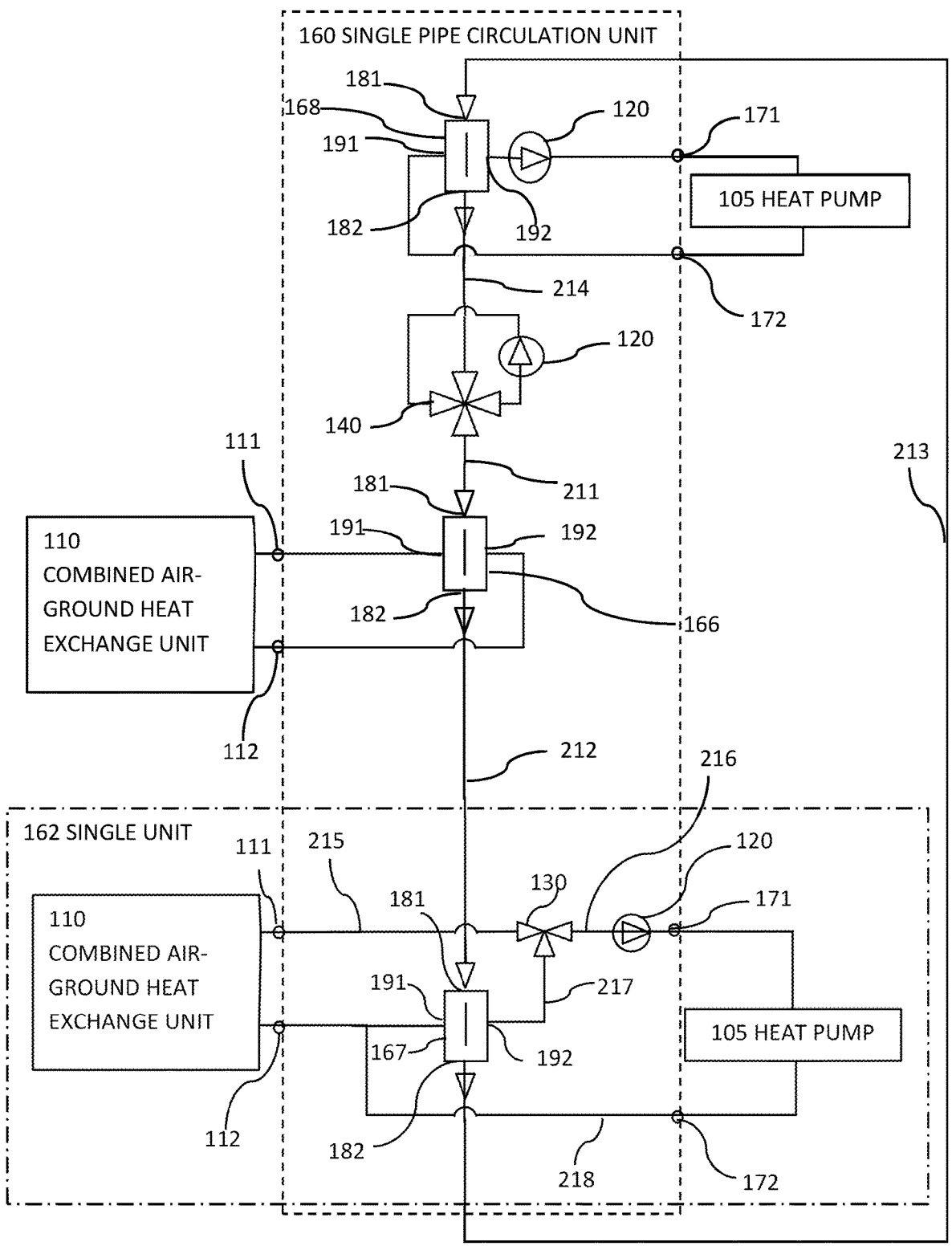
FIG. 7 shows a schematic representation of a system for providing usable source fluid incorporating a reversible, single pipe circulation unit of one embodiment of the present invention.

FIG. 7 shows a schematic representation of a system for providing usable source fluid incorporating a reversible, single pipe circulation unit 160 of one embodiment of the present invention.

The reversible, single pipe circulation unit 160 may, for instance, be made up of a plurality of reversible flow fixtures connected together via a single pipe loop and a four port reversing valve 140, together with a fluid circulating pump 120.

The reversible, single pipe circulation unit 160 is shown in FIG. 7 as a closed loop, with the circulation source fluid conduit 213 completing the loop. One of ordinary skill in the art will, however, appreciate that the conduit 213 could be extended to incorporate further reversible flow fixtures and, therefore further heat pumps and heat exchange units.

For instance, as shown in FIG. 7, a third port of the four port reversing valve 140 may be connected via a first circulation source fluid conduit 211 to a first flow-through port 181 of the first reversible flow fixture 166. A second flow-through port 182 of the first reversible flow fixture 166 may then be connected via a second circulation source fluid conduit 212 to a first flow-through port 181 of a second reversible flow fixture 167. The second flow-through port 182 of the second reversible flow fixture 167 may then be connected via a third circulation source fluid conduit 213 to a first flow-through port 181 of a third reversible flow fixture 168. That third reversible flow fixture 168 may then be connected via its second flow-through port 182 and a fourth circulation source fluid conduit 214 to a first port of the four port reversing valve 140, thereby completing the looped chain of reversible flow fixtures. One of ordinary skill in the art will, however, appreciate although FIG. 7 only shows three reversible flow fixtures in the loop, any reasonable number of them may be incorporated in the reversible, single pipe circulation unit.

A second port of the four port reversing valve 140 may then connect via a fluid circulating pump 120 and a fifth circulation source fluid conduit 215 back to a third port of the four port reversing valve 140. In this way, when the four port reversing valve 140 is placed in setting "5", source fluid may be circulated around the reversible, single pipe circulation unit 160 in a clockwise direction, and when the valve is in setting "6", in an anti-clockwise direction. Reversing the flow may, for instance, be used to average out the temperature of the source fluid at each of the reversible flow fixtures over time.

Each of the reversible flow fixtures may be connected to either a heat pump 105 or a combined air-ground heat exchange unit 110, or both. The combined air-ground heat exchange units 110 may, for instance, be any of the types discussed above.

As shown in FIG. 7, a first side-flow port 191 of the third reversible flow fixture 168 may be fluidly connected to a return point 172 that may then be fluidly connected to a heat pump 105. A second side-flow port 192 of the third reversible flow fixture 168 may be connected to a take-off point 171 of the reversible, single pipe circulation unit 160 that may then be fluidly connected to a heat pump 105. In this way, source fluid may be feed from the primary loop, or circulation source fluid conduits, to the heat pump 105.

Also shown in FIG. 7, a first side-flow port 191 of the first reversible flow fixture 166 may be fluidly connected to an exit point 111 of the reversible, single pipe circulation unit 160 that may then be fluidly connected to a combined air-ground heat exchange unit 110. A second side-flow port 192 of the first reversible flow fixture 166 may be fluidly connected to an entry point 112 of the reversible, single pipe circulation unit 160 that may then be fluidly connected to a combined air-ground heat exchange unit 110. In this way, the combined air-ground heat exchange unit 110 may provide conditioned source fluid to the primary loop, or circulation source fluid conduit, of the reversible, single pipe circulation unit 160.

A reversible flow fixture may connect both a combined air-ground heat exchange unit 110 and a heat pump 105 to the reversible, single pipe circulation unit 160.

As shown in FIG. 7, a fifth circulation source fluid conduit 215 may fluidly connect an exit point 111 to both a combined air-ground heat exchange unit 110 and to a first port of a T-port valve 130. A sixth circulation source fluid conduit 216 may connect a third port of the T-port valve 130 via a fluid circulating pump 120 to a take-off point 171 that may connect to a heat pump 105. A seventh circulation source fluid conduit 217 may connect a second side-flow port 192 of the second reversible flow fixture 167 to a second port of the T-port valve 130, while an eighth circulation source fluid conduit 218 may connect a return point 172 of the reversible, single pipe circulation unit 160 to both a first side-flow port 191 of the second reversible flow fixture 167 and to an entry point 112 of reversible, single pipe circulation unit 160.

In such a configuration, the second reversible flow fixture 167 may operate in three modes.

In a first, bypass mode, source fluid may flow through the second reversible flow fixture 167 with neither the heat pump 105 taking source fluid from it, or the combined air-ground heat exchange unit 110 supplying source fluid to it. This may, for instance, be accomplished by setting the fluid circulating pump 120 to "OFF", the T-port valve 130 to setting "3" and the combined air-ground heat exchange unit 110 to "OFF".

In a second, standard operational mode, the T-port valve 130 may be in setting "1", allowing source fluid to flow between all three ports. With the fluid circulating pump 120 operating at half the flow rate of the pump in the combined air-ground heat exchange unit 110, fluid may then flow from the exit point 111, then divide so that half flows on through take-off point 171 to the heat pump 105, while the other half is fed into to the loop via the second side-flow port 192. The source fluid may then flow back from the heat pump 105 to the combined air-ground heat exchange unit 110 via entry point 112.

In a third stand-alone mode, the T-port valve 130 may be in setting "3", allowing flow from the first to the third port. In this mode, source fluid may flow directly from exit point 111 to the take-off point 171, pumped by the fluid circulating pump 120, allowing flow from the combined air-ground heat exchange unit 110 to the heat pump 105. The fluid may then flow through return point 172 and back via entry point 112.

The stand-alone mode may, for instance, be useful if the main flow in the reversible, single pipe circulation unit 160, i.e., the flow along the main circulation source fluid conduit, is stopped for any reason.

As shown in FIG. 7, the second reversible flow fixture 167 and associated combined air-ground heat exchange unit 110 and heat pump 105 may all be part of a single unit 162. The single unit 162 may, for instance, be a single building that may incorporate its own combined air-ground heat exchange unit 110 and heat pump 105 but may also elect to be able to operate in conjunction with a reversible, single pipe circulation unit 160.

Figure 8:
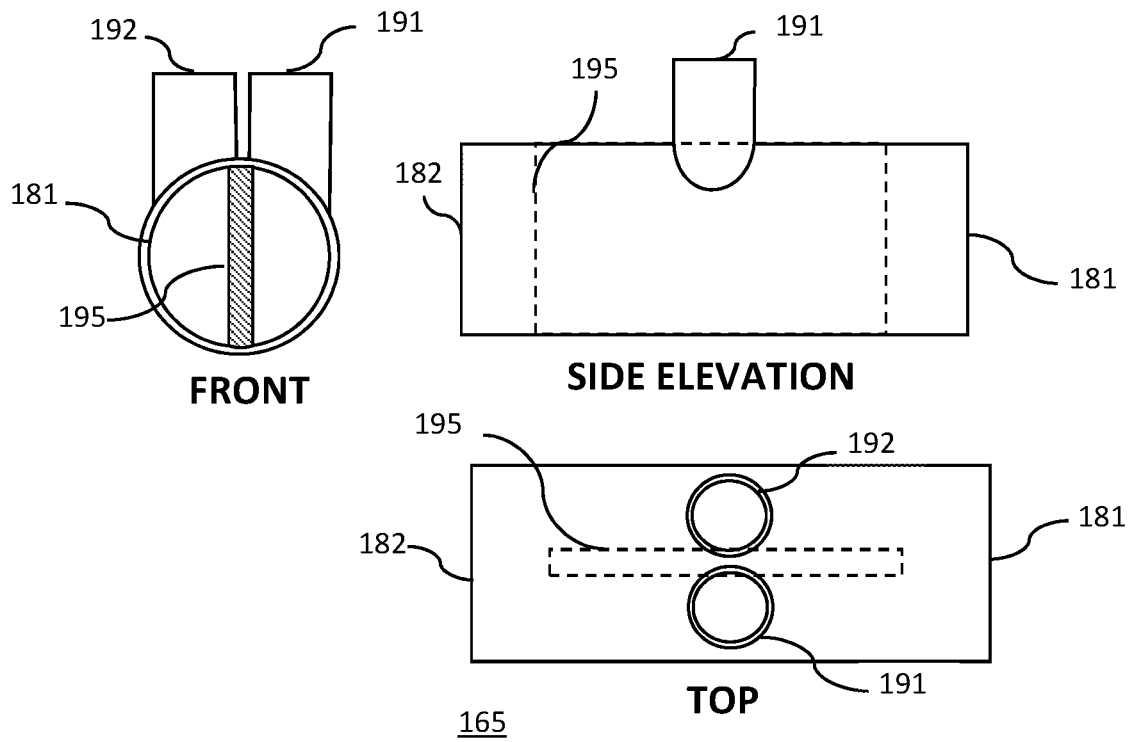
FIG. 8 shows orthographic views of one embodiment of a reversible flow fixture.

FIG. 8 shows orthographic views of one embodiment of a reversible flow fixture. As shown in FIG. 8, a reversible flow fixture 165 may have a main fluid conduit that may, for instance, transport source fluid along a main conduit from a first flow-through port 181 through to a second flow-through port 182, or vice-versa. This flow along the main conduit may only be minimally impeded by a flow separator 195. The flow separator 195 may, however, function to divide the flow along the main conduit into two approximately equal flows.

There may be two side-flow ports, that may be smaller, to allow source fluid to be tapped off from the source fluid flowing in the main conduit. As shown in FIG. 8, a first side-flow port 191 may be attached so as to access source fluid on one side of the flow separator 195, while a second side-flow port 192 may be attached so as to access fluid on the other side of the flow separator 195. In such an arrangement, source fluid from the first side-flow port 191 may be impeded by the flow separator 195 and may not flow directly to the second side-flow port 192, and vice-versa.

In the case, for instance, in which the main conduit may be carrying source fluid conditioned to be as cold as required for the purpose of making cooling heat pumps more efficient, the first side-flow port 191 may be used to tap off cold source fluid for a heat pump. The warmed source fluid from the heat pump may then be returned to the main conduit via the second side-flow port 192. The flow separator 195 may, however, prevent the returned, heated source fluid from entering back via the first side-flow port 191, but instead, mix it in with the source fluid flowing in the main conduit.

Reversible flow fixtures are well-known and are commercially available as, for instance, LoadMatch® Twin-Tee® fittings supplied by Taco Comfort Solutions of Cranston, R.I.

Figure 9:
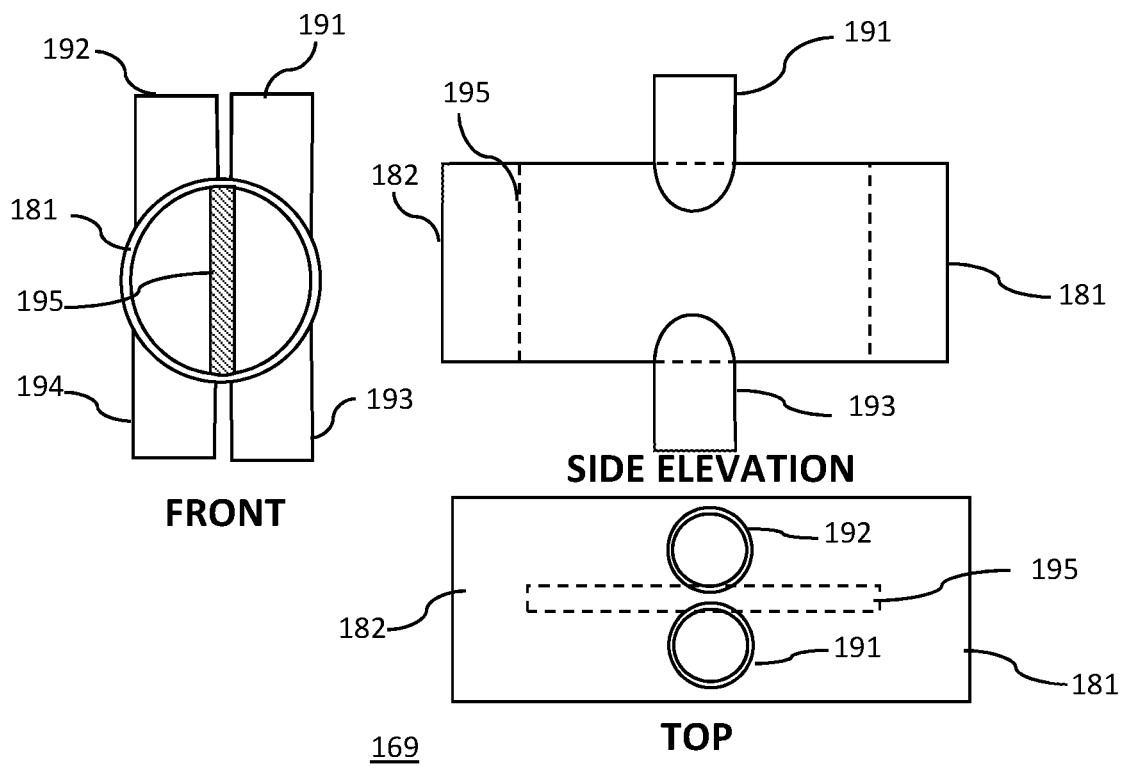
FIG. 9 shows orthographic views of one embodiment of a dual reversible flow fixture.

FIG. 9 shows orthographic views of one embodiment of a dual reversible flow fixture.

As shown in FIG. 9, a dual reversible flow fixtures 169 may be similar to a reversible flow fixture in that it may also have a main fluid conduit that may transport source fluid along a main conduit from a first flow-through port 181 through to a second flow-through port 182, or vice-versa. This flow along the main conduit may only be minimally impeded by a flow separator 195. The flow separator 195 may, however, function to divide the flow along the main conduit into two approximately equal flows. The dual reversible flow fixture 169 may then have four access ports, a first side-flow port 191, a second side-flow port 192, a third side-flow port 193, and a fourth side-flow port 194. As shown in FIG. 9, the first side-flow port 191 and the third side-flow port 193 may access source fluid in the main conduit from one side of the flow separator 195, while the other two access ports, the second side-flow port 192 and the fourth side-flow port 194, may access source fluid from the other side of the flow separator 195.

Such an arrangement may, for instance, be used to connect a combined air-ground heat exchange unit and a heat pump may to a reversible, single pipe circulation unit in a further stand-alone mode, as is described in more detail below.

Figure 10:
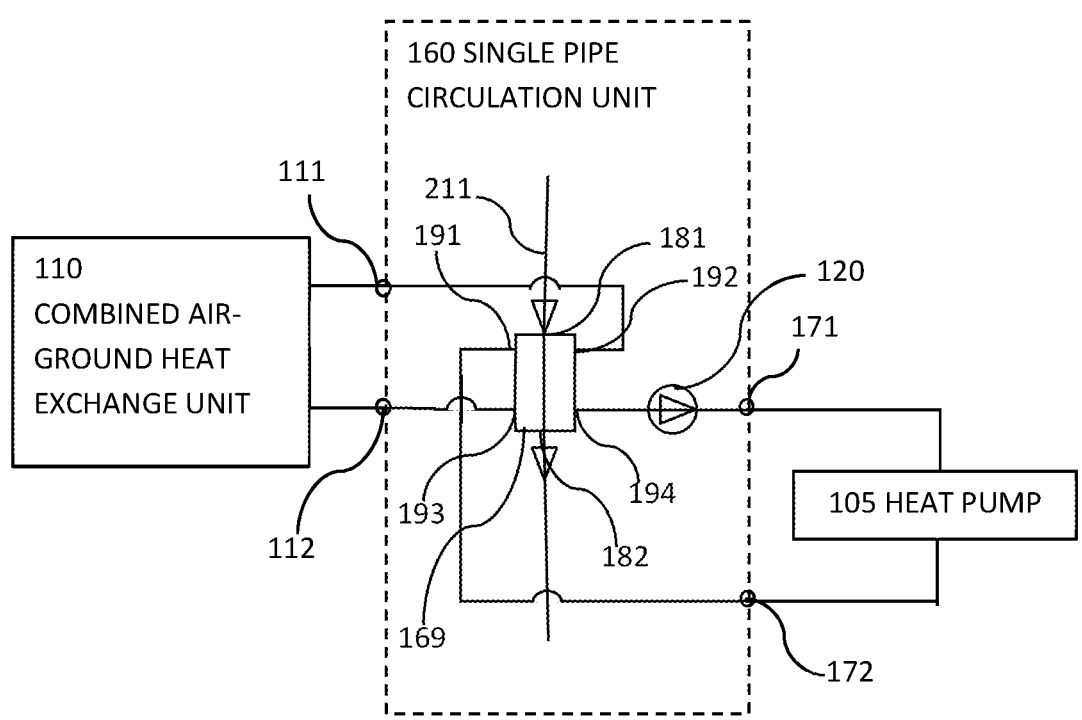
FIG. 10 shows a schematic representation of a system for providing usable source fluid incorporating a reversible, single pipe circulation unit using a dual reversible flow fixture of one embodiment of the present invention.

FIG. 10 shows a schematic representation of a system for providing usable source fluid incorporating a reversible, single pipe circulation unit using a dual reversible flow fixture of one embodiment of the present invention.

As shown in FIG. 10, source fluid in a reversible, single pipe circulation unit 160 may be circulating in a main circulation source fluid conduit 211 and flow through a dual reversible flow fixture 169 from a first flow-through port 181 to a second flow-through port 182, or vice-versa.

A combined air-ground heat exchange unit 110 may be connected to the reversible, single pipe circulation unit 160 via an exit point 111 and an entry point 112.

The combined air-ground heat exchange unit 110 may, for instance, be connected such that the exit point 111 is fluidly connected to the second side-flow port 192 of the dual reversible flow fixture 169, while the entry point 112 is fluidly connected to the fourth side-flow port 194, i.e., to flow-through ports that may be separated by the flow separator of the dual reversible flow fixture.

At the same time, a heat pump 105 may be connected to the reversible, single pipe circulation unit 160 via a take-off point 171 and a return point 172.

The heat pump 105 may, for instance, be connected such that the take-off point 171 is fluidly connected via a fluid circulating pumps 120 to fourth side-flow port 194 of the dual reversible flow fixture 169, while the return point 172 is fluidly connected to the third side-flow port 193, i.e., to flow-through ports that may be separated by the flow separator of the dual reversible flow fixture.

In this way, the system may operate in a standard mode in which conditioned source fluid from the combined air-ground heat exchange unit 110 may be fed into the main circulation source fluid conduit 211, independent of source fluid being accessed by the heat pump 105.

The system may also operate in a by-pass, or independent, mode in which no source fluid may be circulating through the main circulation source fluid conduit 211, so conditioned source fluid from the combined air-ground heat exchange unit 110 may flow via the second side-flow port 192 to the fourth side-flow port 194 and out to the heat pump 105, and be returned via the first side-flow port 191 and the third side-flow port 193 back to the entry point 112 and on to the combined air-ground heat exchange unit 110.

Figure 11:
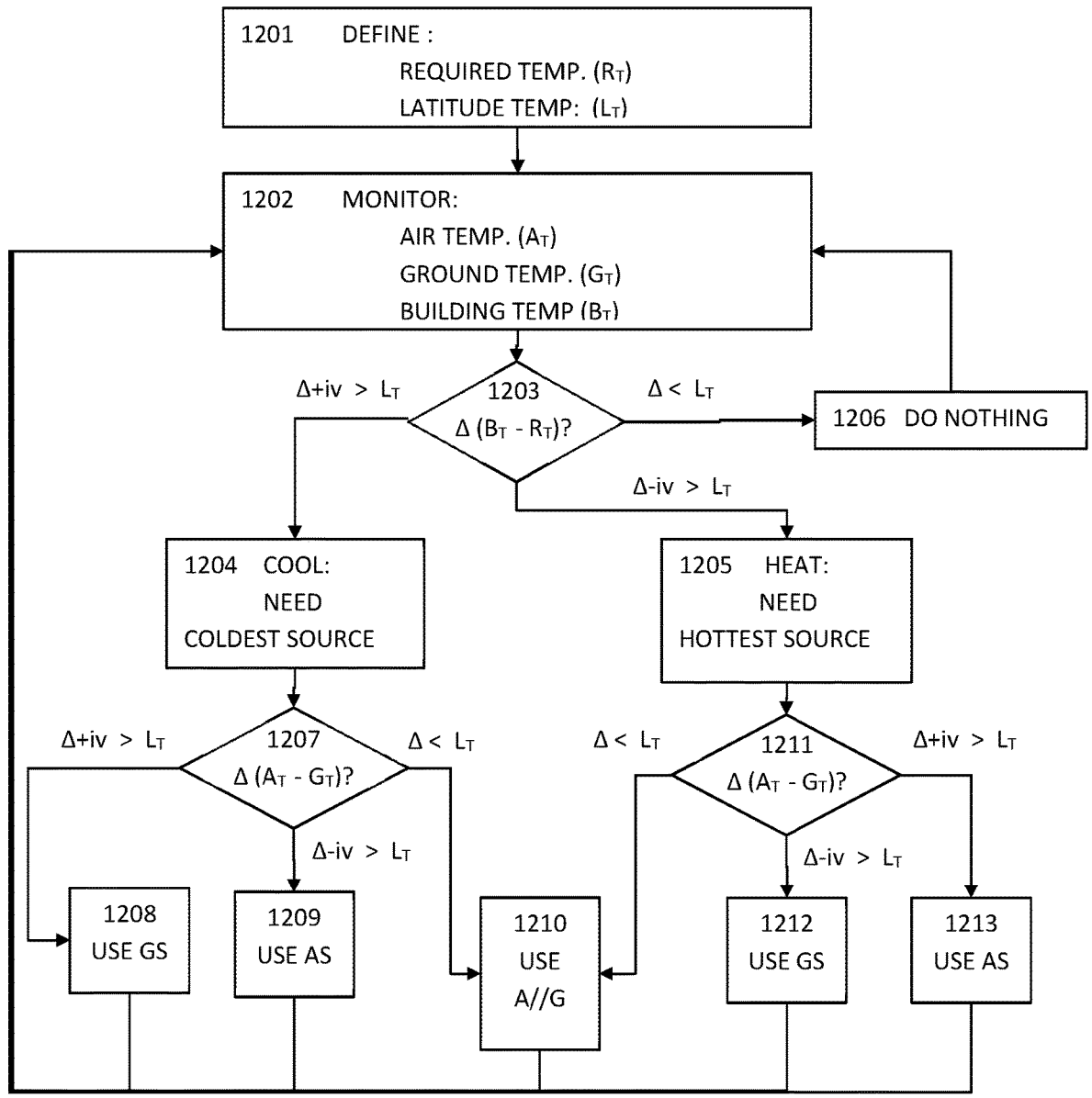
FIG. 11 is a schematic flow chart showing representative steps of a method of controlling a system for providing usable source fluid of one embodiment of the present invention.

FIG. 11 is a schematic flow chart showing representative steps of a method of controlling a system for providing usable source fluid of one embodiment of the present invention.

In Step 1201: "DEFINE: REQUIRED TEMP. ($R_T$) LATITUDE TEMP: ($L_T$)", a temperature that a facility is required to be in, a Required Temperature ($R_T$), may be defined by a user of the system, as well as a range that temperatures may deviate from required temperatures, a Latitude Temperature ($L_T$), that may be defined by the user.

One of ordinary skill in the art will appreciate that different Latitude Temperatures ($L_T$) may be defined for each of the system control functions to be described. However, for simplicity, in the following example, only one is used.

In Step 1202: "MONITOR: AIR TEMP. ($A_T$), GROUND TEMP. ($G_T$), BUILDING TEMP ($B_T$)" a number of temperatures in the system may be monitored. These may include measurements such as, but not limited to, an Air Temperature ($A_T$), a Ground Temperature ($G_T$), and a Building Temperature ($B_T$).

The Air Temperature ($A_T$) may, for instance, be the temperature of the ambient air in a vicinity of a thermal exchange unit such as, but not limited to, an air-to-liquid heat exchanger. In an alternative embodiment, the Air Temperature ($A_T$) may instead refer to the temperature of the source fluid exiting such a thermal exchange unit without significantly altering the inventive principles of the control method outlined in the flow chart of FIG. 11.

The Ground Temperature ($G_T$) may, for instance, be the temperature in, or in a vicinity of, a thermal exchange and storage unit (TXS) such as, but not limited to, to a ground heat exchanger. In an alternative embodiment, the Ground Temperature ($G_T$) may instead refer to the temperature of the source fluid exiting such a thermal exchange and storage unit (TXS) without significantly altering the inventive principles of the control method outlined in the flow chart of FIG. 11.

The Building Temperature (BT) may be a temperature inside a facility that the system may be operative to maintain within a certain temperature range.

The temperature measurements may, for instance, be made using well-known temperature measurement technologies such as, but not limited to, thermocouple technology.

In Step 1203 "$\Delta(B_T-R_T)$?", the temperature difference between the Building Temperature ($B_T$) and the Required Temperature ($R_T$) is obtained. If this temperature difference is less than, or equal to, the Latitude Temperature ($L_T$), then the facility may be assumed to be within the required temperature range. Consequently, no immediate action may be required, and the system may return via Step 1206 "DO NOTHING" to Step 1202 and resume monitoring of the temperatures.

If, however, the temperature difference is greater than the Latitude Temperature ($L_T$) in a positive sense, i.e., Building Temperature ($B_T$) is greater than the Required Temperature ($R_T$) by more than the Latitude Temperature ($L_T$), then cooling of the facility may be required, and the system may move to Step 1204 "COOL: NEED COLDEST SOURCE".

If, however, the temperature difference is greater than the Latitude Temperature ($L_T$) in a negative sense, i.e., Building Temperature ($B_T$) is less than the Required Temperature ($R_T$) by more than the Latitude Temperature ($L_T$), then heating of the facility may be required, and the system may move to Step 1205 "HEAT: NEED HOTTEST SOURCE".

If the system arrives at Step 1204, the coldest source of source fluid may then be sought.

In Step 1207 "$\Delta(A_T-G_T)$?" the system may obtain the temperature difference between the Air Temperature ($A_T$) and the Ground Temperature ($G_T$).

If this temperature difference is greater than the Latitude Temperature ($L_T$) in a positive sense, i.e., the Air Temperature ($A_T$) is greater than the Ground Temperature ($G_T$) by more than the Latitude Temperature ($L_T$), then the system may proceed to Step 1208 "USE GS" in which the system may select to obtain source fluid exclusively from a thermal exchange and storage unit (TXS) that may, for instance, be a ground heat exchanger, hence the terminology Ground Source (GS) mode. Such a source may supply the colder source fluid and, therefore, make the operation of any source fluid utilizing unit, that may be a heat pump, more efficient when it is used for cooling a facility.

If this temperature difference is greater than the Latitude Temperature ($L_T$) in a negative sense, i.e., the Air Temperature ($A_T$) is less than the Ground Temperature ($G_T$) by more than the Latitude Temperature ($L_T$), then the system may proceed to Step 1209 "USE AS" in which the system may select to obtain source fluid exclusively from a thermal exchange unit that may, for instance, be an air-to-liquid heat exchanger, hence the terminology Air Source (AS) mode. Such a source may supply the colder source fluid and, therefore, make the operation of any source fluid utilizing unit, that may be a heat pump, more efficient when it is used for cooling a facility.

If, however, this temperature difference is less than, or equal, to the required Latitude Temperature ($L_T$) for this comparison, then the system may proceed to Step 1210 "USE A//G" in which the system may select to utilize the thermal exchange unit (TXU) and the thermal exchange and storage unit (TXS) in a parallel mode of operation. This may, for instance, mean using an air-to-liquid heat exchanger in parallel with a ground heat exchanger, hence the terminology A//G. As discussed in more detail below, heat transfer between source fluid and an exchange unit may depend on the flow rate of the source fluid. Within certain temperature ranges it may, therefore, be more efficient to use multiple exchanges in which the flow rate is reduced rather than either of them individually but with a higher flow rate. This is the option that may be selected in Step 1210 to optimally supply the coldest source fluid and, therefore, make operation of the source fluid utilizing unit optimal for cooling, given the prevailing status of the units used to condition the source fluid.

If the system arrives at Step 1205, the hottest source of source fluid may then be sought.

In Step 1211 "$\Delta(A_T-G_T)$?" the system may obtain the temperature difference between the Air Temperature ($A_T$) and the Ground Temperature ($G_T$).

If this temperature difference is greater than the Latitude Temperature ($L_T$) in a negative sense, i.e., the Air Temperature ($A_T$) is less than the Ground Temperature ($G_T$) by more than the Latitude Temperature ($L_T$), then the system may proceed to Step 1212 "USE GS" in which the system may select to obtain source fluid exclusively from a thermal exchange and storage unit (TXS) that may, for instance, be a ground heat exchanger, hence the terminology Ground Source (GS) mode. Such a source may now supply the hotter source fluid and, therefore, make the operation of any source fluid utilizing unit, that may be a heat pump, more efficient when it is used for heating a facility.

If this temperature difference is greater than the Latitude Temperature ($L_T$) in a positive sense, i.e., the Air Temperature ($A_T$) is less than the Ground Temperature ($G_T$) by more than the Latitude Temperature ($L_T$), then the system may proceed to Step 1213 "USE AS" in which the system may select to obtain source fluid exclusively from a thermal exchange unit that may, for instance, be an air-to-liquid heat exchanger, hence the terminology Air Source (AS) mode. Such a source may now supply the hotter source fluid and, therefore, make the operation of any source fluid utilizing unit, that may be a heat pump, more efficient when it is used for heating a facility.

If, however, this temperature difference is less than, or equal, to the required Latitude Temperature ($L_T$) for this comparison, then the system may proceed to Step 1210 "USE A//G" in which the system may select to utilize the thermal exchange unit (TXU) and the thermal exchange and storage unit (TXS) in a parallel mode of operation. This may, for instance, mean using an air-to-liquid heat exchanger in parallel with a ground heat exchanger, hence the terminology A//G. As discussed in more detail below, heat transfer between source fluid and an exchange unit may depend on the flow rate of the source fluid. Within certain temperature ranges it may, therefore, be more efficient to use multiple exchanges in which the flow rate is reduced rather than either of them individually but with a higher flow rate. This is the option that may be selected in Step 1210 to optimally supply the hottest source fluid and, therefore, make operation of the source fluid utilizing unit optimal for heating, given the prevailing status of the units used to condition the source fluid.

Whichever mode of operation is selected, the system may return to Step 1202 and continue to monitor and compare temperatures, and make operational adjustments as changing conditions require.

Figure 12:
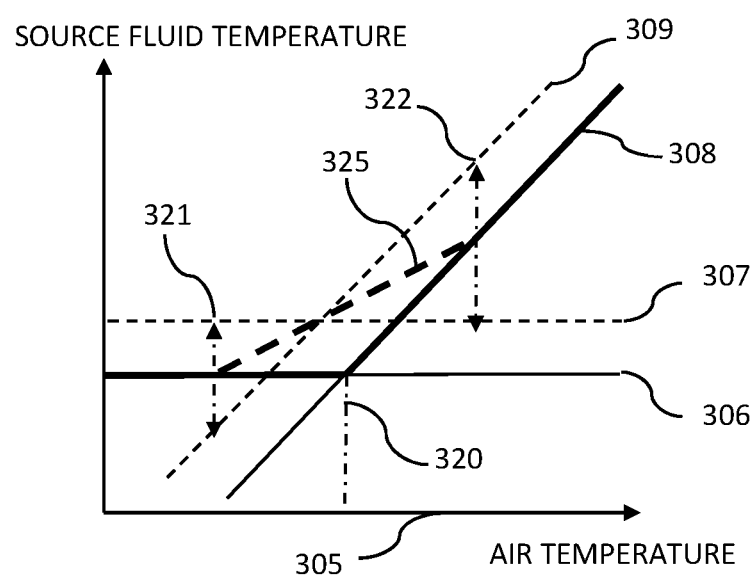
FIG. 12 is a schematic graph showing representative elements of a method of controlling a system for providing usable source fluid of one embodiment of the present invention.

FIG. 12 is a schematic graph showing representative elements of a method of controlling a system for providing usable source fluid of one embodiment of the present invention. The graph shown in FIG. 12 is a plot of source fluid temperature against the ambient air temperature 305.

The ground source exit temperature 306 may, for instance, be the temperature at which the source fluid exits a thermal exchange and storage unit such as, but not limited to, a ground heat exchanger. The temperature of such a storage unit may be essentially independent of the ambient air temperature, and may remain substantially constant throughout the year. However, the temperature of source fluid exiting such a unit after being conditioned by it may be significantly impacted by the rate at which the source fluid is flowed through it. Typically, the slower the flow rate, the closer the temperature of the source fluid as it exits such a unit may become to the temperature of the unit itself. As shown in FIG. 12, the ground source exit temperature 307 at half nominal flow rate may be substantially higher than the ground source exit temperature 306 at nominal flow rate.

The air source exit temperature 308 may, for instance, be the temperature at which source fluid exits a thermal exchange unit such as, but not limited to, an air-to-liquid heat exchanger. The air source exit temperature may be dependent upon the ambient air temperature 305 and may show a substantially linear proportionality to the ambient air temperature 305 over the exchange unit's operational range, as indicated in FIG. 12. The air source exit temperature may also be dependent on the flow rate of the source fluid through the thermal exchange unit. FIG. 12 shows a straight line that may be indicative of the air source exit temperature 308 at nominal flow rate. The graph also shows a straight line that may be indicative of the air source exit temperature 309 at half the nominal flow rate. The air source exit temperature 309 at half the nominal flow rate may be closer to the actual ambient air temperature 305.

In a scenario in which a source fluid utilizing unit may be heating a building, it may be optimal to supply it with the hottest available source fluid. At the beginning of the day, when the ambient air temperature 305 may be low, that source fluid may best be supplied by a thermal exchange and storage unit such as, but not limited to, a ground heat exchanger. The ground source exit temperature 306 may be constant as the ambient air temperature rises, as long as the flow rate through the ground heat exchanger stays reasonably constant. However, the ambient air temperature 305 may rise to reach a switching temperature 320 at which the air source exit temperature 308 matches the ground source exit temperature 307. As the ambient air temperature 305 rises above the switching temperature 320, it may, therefore, become more efficient to switch to using the source fluid supplied by the thermal exchange unit that may be an air-to-liquid heat exchanger.

The switching point described above assumes, for instance, that the air source exit temperature 308 is at a nominal flow rate through the thermal exchange unit, and that the ground source exit temperature 306 is at a nominal flow rate through the ground heat exchanger, and that the nominal flow rate is set by the requirements of the source fluid utilizing unit.

However, since the source fluid at the exit of the exchanges is dependent on the flow rate through them, there may be a parallel mode in which for some range of the ambient air temperature 305 it may be more effective to obtain source fluid from both units, but with each operating at half the nominal flow rate. When, for instance, the ambient air temperature 305 reaches a first transition temperature 321, the average temperature obtained using a combination of source fluid conditioned to the ground source exit temperature 307 operating at half nominal flow rate, and that conditioned to the air source exit temperature 309 of the air-to-liquid heat exchanger operating at half the nominal flow rate, may effectively equal the ground source exit temperature 306 of the ground heat exchanger operating at nominal flow rate. As the ambient air temperature 305 continues to rise, the temperature of the source fluid obtained in this parallel mode may follow the line of the equal flow exit source fluid temperature 325. If, however, the ambient air temperature 305 rises to the second transition temperature 322, any further air temperature rise may mean that it then becomes more efficient to switch to simply using the air-to-liquid heat exchanger operating at nominal flow rate and following the line 308 of the air source exit temperature 308 at nominal flow rate.

One of ordinary skill in the art will appreciate that diagrams analogous to 12 may be obtained for scenarios in which the source fluid utilizing unit requires the coolest available source fluid.

In the parallel mode described in FIG. 12, the switching temperatures were derived using the source fluid obtained by conditioning at half nominal flow rate. Using variable speed pumps, it may be possible to obtain an even more efficient parallel mode in which switching begins using only a very slow flow rate, and therefore a very efficient heat exchange through, for instance, an air-to-liquid heat exchanger. As the ambient air temperature 305 increases, the flow rate through the air-to-liquid heat exchanger may be gradually increased, while the flow rate through the ground heat exchanger may be gradually increased. A curve analogous to the line of equal flow exit source fluid temperature 325 may then be followed up to another switching point in which it once again becomes more efficient to simply use the air-to-liquid heat exchanger.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A combined air-ground heat exchange unit, comprising:
an air-to-liquid heat exchanger;
a ground heat exchanger;
a set of hydraulic components comprising one or more pumps and one or more valves, said hydraulic components being configured to hydraulically connect said an air-to-liquid heat exchanger and said ground heat exchanger such that:

in a first set of configurations, said set of hydraulic components are connected such that said usable source fluid is supplied exclusively from said air-to-liquid heat exchanger to a heat pump;
in a second set of configurations, said set of hydraulic components are connected such that said usable source fluid is supplied exclusively from said ground heat exchanger to said heat pump; and,
in a third set of configurations, said set of hydraulic components are connected such that said usable source fluid is supplied from said air-to-liquid heat exchanger to said ground heat exchanger, and, wherein,
a first source fluid conduit hydraulically connects said air-to-liquid heat exchanger to an exit point via a first T-port valve and a first fluid circulating pump;
a second source fluid conduit hydraulically connects said air-to-liquid heat exchanger to an entry point via a second fluid circulating pump;
a third source fluid conduit hydraulically connects said air-to-liquid heat exchanger to a first port of a first four port reversing valve via said first T-port valve;
a fourth source fluid conduit 204 hydraulically connects said air-to-liquid heat exchanger to a third port of said first four port reversing valve via said second fluid circulating pump;
a fifth source fluid conduit hydraulically connects said first ground heat exchanger to a second port of said first four port reversing valve; and
a sixth source fluid conduit hydraulically connects said first ground heat exchanger to a fourth port of said first four port reversing valve; and
wherein, said heat pump is hydraulically connected to an exit point and to an entry point of said combined air-ground heat exchange unit.

2. A combined air-ground heat exchange unit, comprising:
an air-to-liquid heat exchanger;
a first ground heat exchanger;
a second ground heat exchanger;
a set of hydraulic components comprising one or more pumps and one or more valves, said hydraulic components being configured to hydraulically connect said air-to-liquid heat exchanger and said ground heat exchangers such that:
in a first set of configurations, said set of hydraulic components are connected such that said usable source fluid is supplied exclusively from said air-to-liquid heat exchanger to a heat pump;
in a second set of configurations, said set of hydraulic components are connected such that said usable source fluid is supplied exclusively from either or both of said first and second ground heat exchangers to said heat pump; and,
in a third set of configurations, said set of hydraulic components are connected such that said usable source fluid is supplied from said air-to-liquid heat exchanger to either or both of said first and second ground heat exchangers, and wherein,
a first source fluid conduit hydraulically connects said air-to-liquid heat exchanger to an exit point via a first T-port valve and a first fluid circulating pump;
a second source fluid conduit hydraulically connects said air-to-liquid heat exchanger to an entry point via a second fluid circulating pump;
a third source fluid conduit hydraulically connects said air-to-liquid heat exchanger to a first port of a first four port reversing valve via said first T-port valve;

a fourth source fluid conduit hydraulically connects said air-to-liquid heat exchanger to a third port of said first four port reversing valve via said second fluid circulating pump;

a fifth source fluid conduit hydraulically connects said first ground heat exchanger to a second port of said first four port reversing valve and to a second port of a second T-port valve;

a sixth source fluid conduit hydraulically connects said first ground heat exchanger to a first port of said second T-port valve and to said second ground heat exchanger; and a seventh source fluid conduit hydraulically connecting said second ground heat exchanger to said fourth port of said first four port reversing valve; and wherein, said heat pump is hydraulically connected to said exit point and to said entry point of said combined air-ground heat exchange unit.

3. A combined air-ground heat exchange unit, comprising:

an air-to-liquid heat exchanger;

a first ground heat exchanger;

a second ground heat exchanger;

a set of hydraulic components comprising one or more pumps and one or more valves, said hydraulic components being configured to hydraulically connect said air-to-liquid heat exchanger and said ground heat exchangers such that:

in a first set of configurations, said set of hydraulic components are connected such that said usable source fluid is supplied exclusively from said air-to-liquid heat exchanger to a heat pump;

in a second set of configurations, said set of hydraulic components are connected such that said usable source fluid is supplied exclusively from either or both of said first and second ground heat exchangers to said heat pump;

in a third set of configurations, said set of hydraulic components are connected such that said usable source fluid is supplied from said air-to-liquid heat exchanger to either or both of said first and second ground heat exchangers;

in a fourth set of configurations, said set of hydraulic components are connected such that said usable source fluid is supplied from both said air-to-liquid heat exchanger and from either or both of said first and second ground heat exchangers to said heat pump; and, in a fifth set of configurations, said set of hydraulic components are connected such that said usable source fluid is supplied simultaneously from said air-to-liquid heat exchanger to said heat pump, and to one of said ground heat exchangers; and, wherein, a first source fluid conduit hydraulically connecting a second port on a second T-port valve via said first fluid circulating pump to an exit point;

a second source fluid conduit hydraulically connecting an entry point to a third port of a four port reversing valve;

a third source fluid conduit hydraulically connecting a second port of said four port reversing valve via a second fluid circulating pump to said air-to-liquid heat exchanger;

a fourth source fluid conduit hydraulically connecting said air-to-liquid heat exchanger to a second port of said first T-port valve;

a fifth source fluid conduit hydraulically connecting said first ground heat exchanger to a first port of said first T-port valve and to a third port of said second T-port valve;

a sixth source fluid conduit hydraulically connecting said second ground heat exchanger to third port of said first T-port valve and to a first port of said second T-port valve;

a seventh source fluid conduit hydraulically connecting said first ground heat exchanger to a first port of said first four port reversing valve; and an eighth source fluid conduit hydraulically connecting said second ground heat exchanger to a third port of said first four port reversing valve; and wherein, said heat pump is hydraulically connected to said exit point and to said entry point of said combined air-ground heat exchange unit.

* * * * *